(12) United States Patent
 Qiu et al.

(10) Patent No.: US 11,470,667 B2
(45) Date of Patent: *Oct. 11, 2022

(54) COMMUNICATION METHOD FOR IMPLEMENTING DUAL SIM DUAL ACTIVE, AND TERMINAL

(71) Applicant: Huawei Technologies Co., Ltd., Shenzhen (CN)

(72) Inventors: Fengguang Qiu, Shanghai (CN); Bin Huang, Shanghai (CN); Delai Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,290

(22) Filed: Nov. 20, 2020

(65) Prior Publication Data

US 2021/0076440 A1 Mar. 11, 2021

Related U.S. Application Data

(63) Continuation of application No. 16/496,332, filed as application No. PCT/CN2017/091761 on Jul. 4, 2017, now Pat. No. 10,856,350.

(30) Foreign Application Priority Data

Mar. 25, 2017 (CN) .......................... 201710184955.0

(51) Int. Cl.
 *H04W 88/06* (2009.01)
 *H04W 76/15* (2018.01)
 *H04W 68/00* (2009.01)

(52) U.S. Cl.
 CPC ......... *H04W 76/15* (2018.02); *H04W 68/005* (2013.01); *H04W 88/06* (2013.01)

(58) Field of Classification Search
 CPC ....... H04W 4/00; H04W 4/16; H04W 68/005; H04W 67/15; H04W 88/06; H04W 36/14; H04W 8/20
 See application file for complete search history.

(56) References Cited

U.S. PATENT DOCUMENTS

2003/0193964 A1  10/2003  Bae et al.
2012/0289285 A1  11/2012  Clevorn et al.
 (Continued)

FOREIGN PATENT DOCUMENTS

CN   102685714 A   9/2012
CN   103262625 A   8/2013
 (Continued)

OTHER PUBLICATIONS

3GPP TR 37.805 V1.4.0 "3rd Generation Partnership Project; Technical Specification Group Radio Access Network Study on HSPA and LTE Joint Operation (Release 14)," Nov. 2016, 27 pages.
 (Continued)

*Primary Examiner* — Thanh C Le
(74) *Attorney, Agent, or Firm* — Conley Rose, P.C.

(57) ABSTRACT

A terminal supporting dual receive single transmit-dual subscriber identity module (SIM) dual standby (DR-DSDS) includes a first SIM card interface and a second SIM card interface, and the first SIM card interface is configured to communicate with a first SIM card, and the second SIM card interface is configured to communicate with a second SIM card. The terminal is configured to, when the terminal is in a first communication connection, receive a paging request for establishing a second communication connection, and when the paging request carries a first identifier indicating a second service, respond to the paging request to establish the second communication connection.

22 Claims, 20 Drawing Sheets

(56) References Cited

U.S. PATENT DOCUMENTS

| | | | |
|---|---|---|---|
| 2013/0065570 A1 | 3/2013 | Jung et al. | |
| 2013/0150014 A1 | 6/2013 | Gong et al. | |
| 2014/0106747 A1 | 4/2014 | Josso et al. | |
| 2016/0112084 A1 | 4/2016 | Parron et al. | |
| 2016/0142960 A1 | 5/2016 | Liu et al. | |
| 2016/0142998 A1 | 5/2016 | Tsai et al. | |
| 2016/0219421 A1 | 7/2016 | Shi et al. | |
| 2016/0301790 A1* | 10/2016 | Kanamarlapudi | H04M 1/575 |
| 2017/0094628 A1 | 3/2017 | Miao et al. | |
| 2020/0068647 A1* | 2/2020 | Jha | H04W 76/27 |
| 2020/0107327 A1* | 4/2020 | Wang | H04B 7/0695 |
| 2020/0245292 A1* | 7/2020 | Huang | H04M 1/72403 |
| 2020/0396714 A1* | 12/2020 | Lee | H04W 68/02 |
| 2021/0029773 A1* | 1/2021 | Majumder | H04W 8/183 |

FOREIGN PATENT DOCUMENTS

| | | |
|---|---|---|
| CN | 103874041 A | 6/2014 |
| CN | 104115454 A | 10/2014 |
| CN | 104270827 A | 1/2015 |
| CN | 104581992 A | 4/2015 |
| CN | 105338178 A | 2/2016 |
| CN | 105554884 A | 5/2016 |
| CN | 105611588 A | 5/2016 |
| JP | 2005520452 A | 7/2005 |
| KR | 20090047086 A | 5/2009 |
| KR | 20130066532 A | 6/2013 |
| WO | 2003090379 A1 | 10/2003 |

OTHER PUBLICATIONS

3GPP TS 36.300 V13.7.0 (Mar. 2017), 3rd Generation Partnership Project Jechnical Specification Group Radio Access Network;Evolved Universal Terrestrial Radio Access (E-UTRA) and Evolved Universal Terrestrial Radio Access Network (E-UTRAN);Overall description;Stage 2(Release 13), total 312 pages.

3GPP TS 36.304 V14.2.0 (Mar. 2017), 3rd Generation Partnership Project Jechnical Specification Group Radio Access Network;Evolved Universal Terrestrial Radio Access (E-UTRA); User Equipment (UE) procedures in idle mode (Release 14), total 49 pages.

3GPP TS 36.413 V13.5.0 (Jan. 2017), 3rd Generation Partnership Project Jechnical Specification Group Radio Access Network;Evolved Universal Terrestrial Radio Access Network(E-UTRAN);S1 Application Protocol (S1AP)(Release 13), total 333 pages.

3GPP TS 36.331 V14.2.0, "3rd Generation Partnership Project; Technical Specification Group Radio Access Network; Evolved Universal Terrestrial Radio Access (E-UTRA); Radio Resource Control (RRC); Protocol specification (Release 14)," Mar. 2017, 717 pages.

3GPP TS 23.401 V14.3.0 "3rd Generation Partnership Project; Technical Specification Group Services and System Aspects; General Packet Radio Service (GPRS) enhancements for Evolved Universal Terrestrial Radio Access Network (E-UTRAN) access (Release 14)," Mar. 2017, 386 pages.

R2-086264 (R2-085225), Nokia et al., "Text proposal to clean up Paging," 3GPP Tsg-Ran WG2 Meeting #64, Prague, Czech Republic, Nov. 10-14, 2008, 4 pages.

* cited by examiner

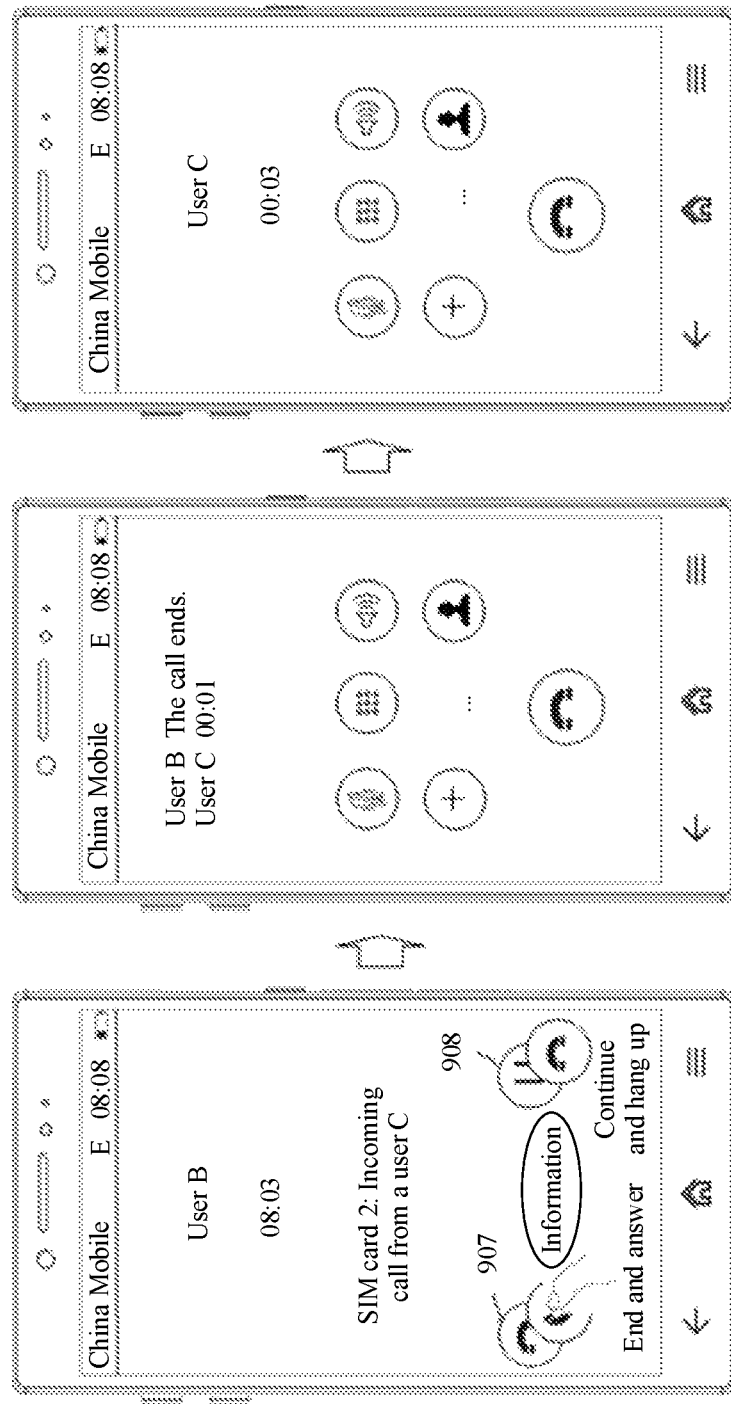

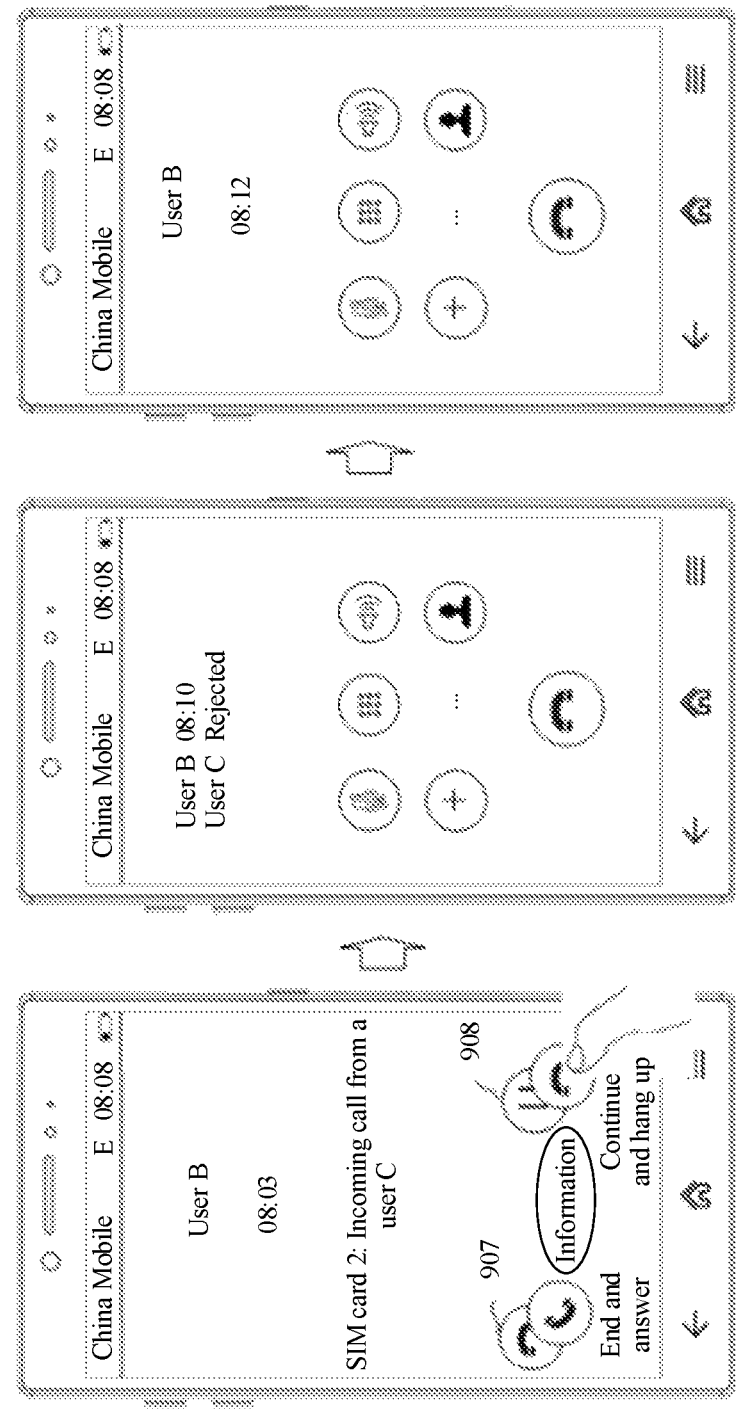

COMMUNICATION METHOD FOR IMPLEMENTING DUAL SIM DUAL ACTIVE, AND TERMINAL

CROSS-REFERENCE TO RELATED APPLICATIONS

This application is a continuation of U.S. patent application Ser. No. 16/496,332 filed on Sep. 20, 2019, which is a U.S. National Stage of International Patent Application No. PCT/CN2017/091761 filed on Jul. 4, 2017, which claims priority to Chinese Patent Application No. 201710184955.0 filed on Mar. 25, 2017. All of the aforementioned applications are hereby incorporated by reference in their entireties.

TECHNICAL FIELD

Embodiments of this application relate to the field of communications technologies, and in particular, to a communication method for implementing dual SIM dual active, and a terminal.

BACKGROUND

With development of communications technologies, many mobile terminals (such as mobile phones) have a dual card dual standby function. Dual card dual standby means that two subscriber identity module (Subscriber Identity Module, SIM) cards are installed in one mobile phone, and the two SIM cards can be standby online.

Currently, a dual SIM dual active (Dual SIM Dual Active, DSDA) technology has been applied to a mobile phone supporting dual receive single transmit-dual SIM dual standby (Dual Receive-Dual SIM Dual Standby, DR-DSDS). Only one radio frequency transmit (Transmit, Tx) channel and two radio frequency receive (Receive, Rx) channels are configured for the mobile phone supporting DR-DSDS. When a SIM card 1 performs voice data transmission, a SIM card 2 may receive a paging (paging) request. After the SIM card 2 receives the paging request, the mobile phone supporting DR-DSDS may send radio resource control (Radio Resource Control, RRC) signaling to a network device in response to the paging request, to establish an RRC connection to the network device, and perform a service corresponding to the paging request.

However, in the scenario in which "when a SIM card 1 performs voice data transmission, a SIM card 2 may receive a paging request," if the mobile phone supporting DR-DSDS sends, in response to the paging request, the RRC signaling to the network device by occupying a radio frequency Tx channel, because the RRC signaling occupies the radio frequency Tx channel, sending of a voice packet of the SIM card 1 that is to be sent by the mobile phone supporting DR-DSDS is delayed. Consequently, quality of voice communication of the SIM card 1 is affected.

SUMMARY

Aspects of this application provide a communication method for implementing dual SIM dual active, and a terminal, to effectively ensure quality of a voice call for a first SIM card, and implement dual SIM dual active of a terminal supporting DR-DSDS, thereby improving user experience.

To achieve the foregoing objective, the following technical solutions are used in this application.

According to a first aspect, a communication method for implementing dual SIM dual active is provided. The method is applied to a terminal supporting DR-DSDS. The terminal includes a first SIM card interface and a second SIM card interface. The first SIM card interface is configured to communicate with a first SIM card; and the second SIM card interface is configured to communicate with a second SIM card. The method includes: when the terminal is in a first communication connection (that is, when the terminal is performing a first service related to the first SIM card), receiving, by the terminal, a paging request for establishing a second communication connection related to the second SIM card (namely, a paging request for the second SIM card); and when the paging request for the second communication connection that is received by the terminal carries a first identifier used to indicate a second service, immediately responding, by the terminal, to the paging request for establishing the second communication connection.

In a scenario in which both the first service and the second service are voice calls, when the terminal is in a call state related to the first SIM card, if the terminal receives the paging request for the second SIM card, and the paging request carries the first identifier used to indicate the voice call, the terminal performs an incoming call notification for the second SIM card in response to the paging request, to implement dual SIM dual active of the terminal, thereby improving user experience. Further, in this application, the terminal responds to the paging request only when the paging request carries the first identifier, thereby reducing interference of a paging request for a data connection to the voice call for the first SIM card, and reducing impact on quality of the voice call for the first SIM card.

In conclusion, according to the solution, the terminal can effectively reduce the impact on the quality of the voice call for the first SIM card, and dual SIM dual active of the terminal can be further implemented, thereby improving user experience.

Optionally, in a possible implementation of this application, the paging request for the second communication connection may be a paging request in a long term evolution (Long Term Evolution, LTE) network, and the second service may be the voice call. After receiving the paging request in the LTE network that carries the first identifier, the terminal determines that the paging request is used to request to perform a VoLTE voice service. Correspondingly, the terminal may establish a radio resource control (Radio Resource Control, RRC) connection to a radio access network device, exchange session initiation protocol (Session Initiation Protocol, SIP) signaling with the radio access network device after establishing the RRC connection, obtain, from the radio access network device, incoming call information corresponding to the second communication connection, and then perform an incoming call notification for the second communication connection. Specifically, the terminal sends, to the radio access network device in response to the paging request, RRC signaling for establishing the RRC connection, and sends the SIP signaling to the radio access network device. After obtaining the incoming call information corresponding to the second communication connection, the terminal performs the incoming call notification for the second communication connection.

Optionally, because the paging request is used to request to perform the VoLTE voice service, after the terminal establishes the RRC connection to the radio access network device, the terminal device may obtain a request (Invite)

message (namely, an Invite message for the second communication connection) from the radio access network device.

Optionally, in another possible implementation of this application, the RRC signaling sent by the terminal to the radio access network device includes a second identifier used to indicate that the terminal actively requests to establish a voice call link. In this way, the radio access network device may directly determine, based on the RRC signaling, that the terminal requests to establish the voice call link, thereby accelerating a process of communication between the terminal and the radio access network device.

Optionally, in another possible implementation, the paging request for establishing the second communication connection may be used to request to perform the VoLTE voice service, or may be used to request to perform a common data service (such as an Internet access data service). If the paging request for establishing the second communication connection does not carry the first identifier, it indicates that the second communication connection is not the second service related to the second SIM card, and the terminal may continue to process the first communication connection.

According to a second aspect, a terminal is provided. The terminal supports DR-DSDS. The terminal includes a first SIM card interface and a second SIM card interface. The first SIM card interface is configured to communicate with a first SIM card; and the second SIM card interface is configured to communicate with a second SIM card. The terminal includes a receiving module, a sending module, and a response module. The receiving module is configured to: when the terminal is in a first communication connection, receive a paging request for establishing a second communication connection, where the first communication connection is a first service related to the first SIM card, and the second communication connection is related to the second SIM card. The sending module is configured to: when the terminal is in the first communication connection, send a voice packet of the first communication connection. The response module is configured to: when the paging request received by the receiving module carries a first identifier, respond to the paging request, where the first identifier is used to indicate a second service.

Optionally, in a possible implementation of this application, when the second service is a voice call, the sending module is further configured to: send, to a radio access network device, radio resource control RRC signaling for establishing an RRC connection, and send session initiation protocol SIP signaling to the radio access network device. Correspondingly, the receiving module is further configured to obtain incoming call information corresponding to the second communication connection. In this way, the terminal in this application further includes an incoming call notification module. The incoming call notification module is configured to perform an incoming call notification for the second communication connection.

Optionally, in another possible implementation of this application, the RRC signaling sent by the sending module includes a second identifier, and the second identifier is used to indicate that the terminal actively requests to establish a voice call link.

Optionally, in another possible implementation of this application, the response module is further configured to: when the paging request received by the receiving module does not carry the first identifier, continue to process the first communication connection.

It should be noted that, in any one of the second aspect or the possible implementations of the second aspect of this application, for a first priority rule and a second priority rule, reference may be made to the detailed descriptions of the possible implementations of the first aspect. Details are not described herein again in this application.

According to a third aspect, a terminal is provided. The terminal supports DR-DSDS. The terminal includes one or more processors, a memory, a communications interface, a first SIM card interface, and a second SIM card interface. The memory, the communications interface, the first SIM card interface, and the second SIM card interface are coupled to the one or more processors. The first SIM card interface is configured to communicate with a first SIM card; and the second SIM card interface is configured to communicate with a second SIM card. The communications interface includes two radio frequency receive channels (such as a radio frequency receive channel 1 and a radio frequency receive channel 2) and one radio frequency transmit channel. For example, the radio frequency receive channel 1 is used to receive a downlink data packet of a first communication connection, and the radio frequency receive channel 2 is used to receive a downlink data packet of a second communication connection.

The memory is configured to store computer program code; the computer program code includes an instruction; and when the one or more processors execute the instruction, the terminal performs the communication method for implementing dual SIM dual active according to any one of the first aspect or the possible implementations of the first aspect of this application.

Specifically, the communications interface is configured to: when the terminal is in the first communication connection, receive a paging request for establishing the second communication connection, where the first communication connection is a first service related to the first SIM card, and the second communication connection is related to the second SIM card. The one or more processors are configured to: when the paging request for the second communication connection that is received through the radio frequency receive channel 2 carries a first identifier, respond to the paging request for establishing the second communication connection, where the first identifier is used to indicate a second service.

Optionally, in a possible implementation of this application, the communications interface is further configured to: send, to a radio access network device through the radio frequency transmit channel, RRC signaling for establishing an RRC connection, and send SIP signaling to the radio access network device. The communications interface is further configured to obtain, through the radio frequency receive channel 2, incoming call information corresponding to the second communication connection. The one or more processors are further configured to perform an incoming call notification for the second communication connection.

Optionally, in another possible implementation of this application, the RRC signaling sent through the radio frequency transmit channel includes a second identifier, and the second identifier is used to indicate that the terminal actively requests to establish a voice call link.

Optionally, in another possible implementation of this application, the one or more processors are further configured to: when the paging request received through the radio frequency receive channel 2 does not carry the first identifier, continue to process the first communication connection.

According to a fourth aspect, this application provides a computer storage medium. The computer storage medium includes a computer instruction; and when the computer instruction runs on a terminal supporting DR-DSDS, the terminal is enabled to perform the communication method for implementing dual SIM dual active according to any one of the first aspect or the possible implementations of the first aspect.

According to a fifth aspect, this application provides a computer program product includes an instruction; and when the computer program product runs on a terminal supporting DR-DSDS, the terminal supporting DR-DSDS is enabled to perform the communication method for implementing dual SIM dual active according to any one of the first aspect or the possible implementations of the first aspect.

In this application, a name of the terminal does not constitute a limitation on devices or functional modules. During actual implementation, these devices or functional modules may appear with other names. The various devices or functional modules fall within the scope of the claims of this application and their equivalent technologies, provided that functions of the various devices or functional modules are similar to those in this application.

For detailed descriptions of the second aspect, the third aspect, the fourth aspect, the fifth aspect, and their implementations of this application, refer to the detailed descriptions of the first aspect and its implementations. In addition, for beneficial effects of the second aspect, the third aspect, the fourth aspect, the fifth aspect, and their implementations, refer to analysis of beneficial effects of the first aspect and its implementations. Details are not described herein again.

According to a sixth aspect, a communication method for implementing dual SIM dual active is provided, including: receiving, by a mobility management entity (Mobile Management Entity, MME), a first message carrying an identifier of a second SIM card of a terminal and first information used to indicate a priority of the second SIM card of the terminal, where the first message is used to instruct the MME to send a notification message to a radio access network device in a tracking area list (Tracking Area List, TA List) of the terminal, the terminal herein supports dual receive single transmit-dual SIM dual standby DR-DSDS, the terminal includes a first SIM card interface and a second SIM card interface, the first SIM card interface is configured to communicate with a first SIM card, and the second SIM card interface is configured to communicate with the second SIM card; determining, by the MME based on the first information, whether the priority of the second SIM card of the terminal is higher than a preset level; and when the priority of the second SIM card of the terminal is higher than the preset level, sending, by the MME to the radio access network device, a notification message carrying a third identifier used to indicate a second service, to instruct the radio access network device to page the second SIM card of the terminal, and establish a connection to the second service related to the second SIM card of the terminal.

When determining that the priority of the second SIM card of the terminal is higher than the preset level, the MME sends, to the radio access network device, the notification message carrying the third identifier. In this way, the radio access network device may preferentially page the terminal, to quickly complete the second service of the second SIM card of the terminal, thereby improving user experience.

Optionally, in a possible implementation, a method for the "determining, by the MME based on the first information, whether the priority of the second SIM card of the terminal is higher than a preset level" is specifically: if a value of the first information is less than or equal to a preset threshold, determining, by the MME, that the priority of the second SIM card of the terminal is higher than the preset level; or correspondingly, if a value of the first information is greater than a preset threshold, determining, by the MME, that the priority of the second SIM card of the terminal is lower than the preset level.

According to a seventh aspect, a mobility management entity MME is provided. The MME includes a receiving module, a determining module, and a sending module. The receiving module is configured to receive a first message, where the first message carries an identifier of a second subscriber identity module SIM card of a terminal and first information used to indicate a priority of the second SIM card of the terminal, and the first message is used to instruct the MME to send a notification message to a radio access network device in a tracking area list TA list of the terminal. The terminal supports dual receive single transmit-dual SIM dual standby DR-DSDS. The terminal includes a first SIM card interface and a second SIM card interface. The first SIM card interface is configured to communicate with a first SIM card; and the second SIM card interface is configured to communicate with the second SIM card. The determining module is configured to determine, based on the first information in the first message received by the receiving module, whether the priority of the second SIM card of the terminal is higher than a preset level. The sending module is configured to: when the determining module determines that the priority of the second SIM card of the terminal is higher than the preset level, send, to the radio access network device, a notification message carrying a third identifier, where the notification message carrying the third identifier is used to instruct the radio access network device to page the second SIM card of the terminal and establish a connection to a second service related to the second SIM card of the terminal, and the third identifier is used to indicate the second service.

Optionally, in a possible implementation of this application, the determining module is specifically configured to: if a value of the first information is less than or equal to a preset threshold, determine that the priority of the second SIM card of the terminal is higher than the preset level; or if a value of the first information is greater than a preset threshold, determine that the priority of the second SIM card of the terminal is lower than the preset level.

According to an eighth aspect, a mobility management entity MME is provided. The MME includes one or more processors, a memory, and a communications interface. The memory and the communications interface are coupled to the one or more processors. The memory is configured to store computer program code, the computer program code includes an instruction, and when the one or more processors execute the instruction, the MIME performs the communication method for implementing dual SIM dual active according to any one of the sixth aspect or the possible implementations of the sixth aspect of this application.

Specifically, the communications interface is configured to receive a first message, where the first message carries an identifier of a second subscriber identity module SIM card of a terminal and first information used to indicate a priority of the second SIM card of the terminal, and the first message is used to instruct the MME to send a notification message to a radio access network device in a tracking area list TA list of the terminal. The terminal supports dual receive single transmit-dual SIM dual standby DR-DSDS. The terminal includes a first SIM card interface and a second SIM card interface. The first SIM card interface is configured to communicate with a first SIM card; and the second SIM card interface is configured to communicate with the second SIM card. The one or more processors are configured to determine, based on the first information in the first message received through the communications interface, whether the priority of the second SIM card of the terminal is higher than a preset level. The communications interface is further configured to: when the one or more processors determine that the priority of the second SIM card of the terminal is higher than the preset level, send, to the radio access network device, a notification message carrying a third identifier, where the notification message carrying the third identifier is used to instruct the radio access network device to page the second SIM card of the terminal and establish a connection to a second service related to the second SIM card of the terminal, and the third identifier is used to indicate the second service.

Optionally, in a possible implementation of this application, the one or more processors are specifically configured to: if a value of the first information is less than or equal to a preset threshold, determine that the priority of the second SIM card of the terminal is higher than the preset level; or if a value of the first information is greater than the preset threshold, determine that the priority of the second SIM card of the terminal is lower than the preset level.

According to a ninth aspect, a computer storage medium is provided. The computer storage medium includes a computer instruction; and when the computer instruction runs on an MME, the MME is enabled to perform the communication method for implementing dual SIM dual active according to any one of the sixth aspect or the possible implementations of the sixth aspect.

According to a tenth aspect, this application provides a computer program product including an instruction; and when the computer program product runs on an MME, the MIME is enabled to perform the communication method for implementing dual SIM dual active according to any one of the sixth aspect or the possible implementations of the sixth aspect.

In this application, a name of the MME does not constitute a limitation on devices or functional modules. During actual implementation, these devices or functional modules may appear with other names. The various devices or functional modules fall within the scope of the claims of this application and their equivalent technologies, provided that functions of the various devices or functional modules are similar to those in this application.

For detailed descriptions of the seventh aspect, the eighth aspect, the ninth aspect, the tenth aspect, and their implementations of this application, refer to the detailed descriptions of the sixth aspect and its implementations. In addition, for beneficial effects of the seventh aspect, the eighth aspect, the ninth aspect, the tenth aspect, and their implementations, refer to analysis of beneficial effects of the sixth aspect and its implementations. Details are not described herein again.

According to an eleventh aspect, a communication method for implementing dual SIM dual active is provided, including: receiving, by a radio access network device, a notification message sent by a mobility management entity MIME, where the notification message is used to instruct the radio access network device to page a second subscriber identity module SIM card of a terminal, the terminal supports dual receive single transmit-dual SIM dual standby DR-DSDS, the terminal includes a first SIM card interface and a second SIM card interface, the first SIM card interface is configured to communicate with a first SIM card, and the second SIM card interface is configured to communicate with the second SIM card; and when the notification message carries a third identifier, sending, by the radio access network device to the terminal, a paging request carrying a first identifier, where both the third identifier and the first identifier are used to indicate a second service, and the paging request carrying the first identifier is used to request to establish a connection to the second service related to the second SIM card.

After determining that the notification message sent by the MIME carries the third identifier used to indicate the second service, the radio access network device directly sends, to the terminal, the paging request carrying the first identifier. In this way, the terminal can respond to the paging request in time based on the first identifier, to complete the second service of the second SIM card of the terminal, thereby improving user experience.

According to a twelfth aspect, a radio access network device is provided. The radio access network device includes a receiving module and a sending module. The receiving module is configured to receive a notification message sent by an MIME, where the notification message is used to instruct the radio access network device to page a second subscriber identity module SIM card of a terminal. The terminal supports dual receive single transmit-dual SIM dual standby DR-DSDS. The terminal includes a first SIM card interface and a second SIM card interface. The first SIM card interface is configured to communicate with a first SIM card; and the second SIM card interface is configured to communicate with the second SIM card. The sending module is configured to: when the notification message received by the receiving module carries a third identifier, send, to the terminal, a paging request carrying a first identifier, where both the third identifier and the first identifier are used to indicate a second service, and the paging request carrying the first identifier is used to request to establish a connection to the second service related to the second SIM card.

According to a thirteenth aspect, a radio access network device is provided. The radio access network device includes one or more processors, a memory, and a communications interface. The memory and the communications interface are coupled to the one or more processors. The memory is configured to store computer program code, the computer program code includes an instruction, and when the one or more processors execute the instruction, the radio access network device performs the communication method for implementing dual SIM dual active according to the eleventh aspect of this application.

According to a fourteenth aspect, a computer storage medium is provided. The computer storage medium includes a computer instruction; and when the computer instruction runs on a radio access network device, the radio access network device is enabled to perform the communication method for implementing dual SIM dual active according to the eleventh aspect.

According to a fifteenth aspect, a computer program product including an instruction is provided; and when the computer program product runs on a radio access network device, the radio access network device is enabled to perform the communication method for implementing dual SIM dual active according to the eleventh aspect.

A name of the radio access network device does not constitute a limitation on devices or functional modules. During actual implementation, these devices or functional modules may appear with other names. The various devices or functional modules fall within the scope of the claims of this application and their equivalent technologies, provided that functions of the various devices or functional modules are similar to those in this application.

For detailed descriptions of the twelfth aspect, the thirteenth aspect, the fourteenth aspect, the fifteenth aspect, and

DESCRIPTION OF DRAWINGS

FIG. 11A, FIG. 11B and FIG. 11C are second schematic diagrams of a GUI displayed when a terminal performs a method in an embodiment of this application during implementation of this application;

FIG. 12A, FIG. 12B and FIG. 12C are third schematic diagrams of a GUI displayed when a terminal performs a method in an embodiment of this application during implementation of this application;

DESCRIPTION OF EMBODIMENTS

Embodiments of this application provide a communication method for implementing dual SIM dual active. The method may be applied to a terminal supporting DR-DSDS. Two SIM cards (a first SIM card and a second SIM card) may be installed in the terminal, and one radio frequency transmit (Tx) channel and two radio frequency receive (Rx) channels are configured for the terminal. The first SIM card and the second SIM card in the terminal may each occupy one of the two radio frequency Rx channels, and use the radio frequency Tx channel in the terminal in a time sharing manner.

Figure 1:
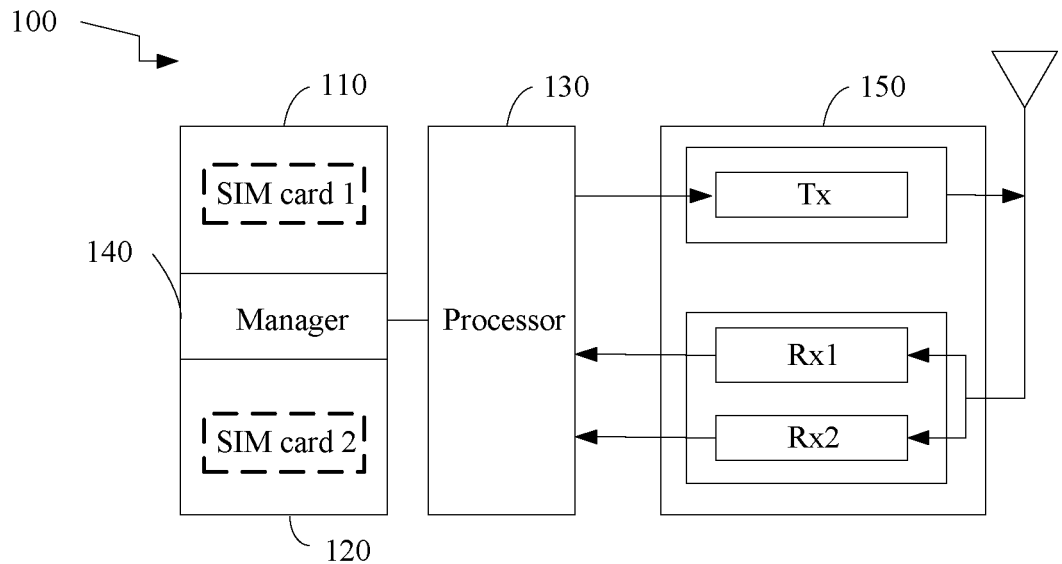
FIG. 1 is a schematic structural composition diagram of a terminal supporting DR-DSDS according to an embodiment of this application.

FIG. 1 is a schematic structural diagram of a terminal supporting DR-DSDS according to an embodiment of this application. As shown in FIG. 1, the terminal 100 may include a first SIM card interface 110, a second SIM card interface 120, a manager 140 coupled to the first SIM card interface 110 and the second SIM card interface 120, a processor 130 coupled to the manager 140, and a transceiver 150 connected to the processor 130. The processor 130 may be a baseband processor (Base Band Processor, BBP). As shown in FIG. 1, the transceiver 150 includes a radio frequency Rx1 channel, a radio frequency Rx2 channel, and a radio frequency Tx channel.

The first SIM card interface 110 is configured to: install a SIM card 1, and communicate with the SIM card 1. The second SIM card interface 120 is configured to: install a SIM card 2, and communicate with the SIM card 2. The manager 140 may send, to the processor 130, an uplink data packet related to a service of the SIM card 1, and send an uplink data packet related to a service of the SIM card 2. The processor 130 may send an uplink data packet to a network device through the radio frequency Tx channel based on a transmit priority of each uplink data packet of the SIM card 1 and the SIM card 2 on the radio frequency Tx channel.

It should be noted that, in this embodiment of this application, the radio frequency Tx channel may also be referred to as a radio frequency Tx resource or a transmitter (Transmitter), and the radio frequency Rx channel may also be referred to as a radio frequency Rx resource or a receiver (Receiver).

In this embodiment, the radio frequency Tx channel and the radio frequency Rx1 channel may also be referred to as primary RF channels, and the radio frequency Rx2 channel may also be referred to as a secondary RF channel. That is, uplink and downlink RF devices in the primary RF channels (such as the radio frequency Tx channel and the radio frequency Rx1 channel) are shared, and there is only a downlink RF device in the secondary RF channel (such as the radio frequency Rx2 channel).

Specifically, a communication method for implementing dual SIM dual active provided in an embodiment of this application may be applied to a scenario in which, when one SIM card (such as a first SIM card, or the SIM card 1) of the terminal supporting DR-DSDS occupies the radio frequency Tx resource to complete a first service (for example, the first service is a voice call), that is, when the terminal is in a first communication connection, if the other SIM card (such as a second SIM card, or the SIM card 2) is accessed with a first paging (paging) request for a second service (for example, the second service is a voice call or a data service) (that is, the terminal receives the first paging request carrying a first identifier and used to establish a second communication connection), the terminal establishes the second communication connection in response to the first paging request, to implement the second service of the second SIM card. The first communication connection is the first service related to the first SIM card, and the second communication connection is related to the second SIM card.

Figure 2:
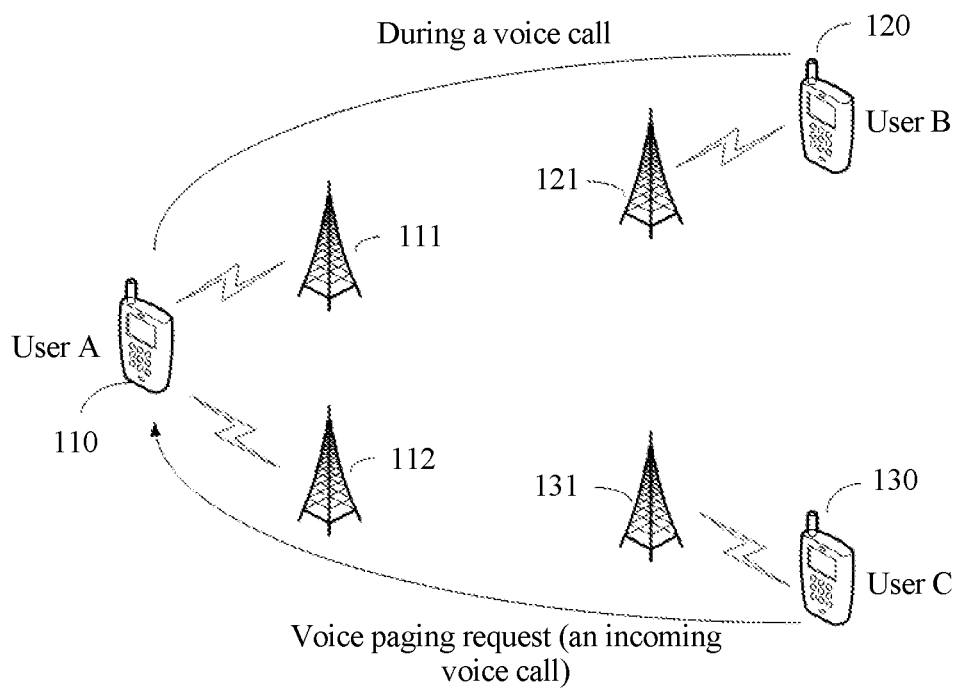
FIG. 2 is an example schematic diagram of an application scenario of a communication method for implementing dual SIM dual active according to an embodiment of this application.

FIG. 2 is an example schematic diagram of an application scenario of a communication method for implementing dual SIM dual active according to an embodiment of this application. A terminal 100 of a user A shown in FIG. 2 may be the foregoing terminal supporting DR-DSDS. Two SIM cards, namely, a SIM card 1 and a SIM card 2, may be installed in the terminal 100. The SIM card 1 of the terminal 100 may be a primary SIM card of the terminal 100, and the SIM card 2 may be a secondary SIM card of the terminal 100; or the SIM card 2 of the terminal 100 may be a primary SIM card of the terminal 100, and the SIM card 1 may be a secondary SIM card of the terminal 100.

After a user B initiates a voice paging request to the SIM card 1 of the terminal 100 by using a terminal 120, the user A may make, by using the terminal 100 through the SIM card 1 of the terminal 100, a voice call with the user B owning the terminal 120. As shown in FIG. 2, in a process in which the user A makes, by using the terminal 100 through the SIM card 1 of the terminal 100, the voice call with the user B owning the terminal 120, a user C may initiate a voice paging request to the SIM card 2 of the terminal 100 by using the terminal 130, to request to make, through the SIM card 2 of the terminal 100, a voice call with the user A owning the terminal 100.

The communication method for implementing dual SIM dual active provided in this embodiment of this application may be applied to the foregoing application scenario. The terminal 100 is accessed with an incoming call request from the terminal 130, that is, an incoming call notification for the SIM card 2 is performed on the terminal 100, without greatly affecting quality of the voice call between the user A and the user B, so that the user can choose to "reject an incoming call for the SIM card 2, and continue a voice call for the SIM card 1," or choose to "hang up a voice call for the SIM card 1, and answer a voice call for the SIM card 2 instead," or choose to "maintain a voice call for the SIM card 1, and answer a voice call for the SIM card 2."

For example, the incoming call notification in this embodiment of this application may include one or more of the following notification modes: ringing of the terminal, display of an incoming call of the user C on a user interface of the terminal, vibration of the terminal, flicker of a flashlight of the terminal, and the like.

For example, each of the two SIM cards of the terminal supporting DR-DSDS in this embodiment of this application may be a SIM card supporting any one of standards such as a global system for mobile communications (Global System for Mobile Communication, GSM) standard, a universal mobile telecommunications system (Universal Mobile Telecommunications System, UMTS) standard, a time division-synchronous code division multiple access (Time Division-Synchronous Code Division Multiple Access, TD-SCDMA) standard, a long term evolution (Long Term Evolution, LTE) standard, and a code division multiple access (Code Division Multiple Access, CDMA) standard.

For example, the SIM card 1 and the SIM card 2 of the terminal 100 shown in FIG. 1 or the FIG. 2 each may be a SIM card supporting the LTE standard. Voice communication performed by the terminal 100 with the terminal 120 through the SIM card 1 may be a (Voice over LTE, VoLTE) service; and voice communication performed by the terminal with the terminal 130 through the SIM card 2 may be a VoLTE service.

Alternatively, the SIM card 1 of the terminal 100 shown in FIG. 1 or FIG. 2 may be a SIM card supporting the LTE standard; and voice communication performed by the terminal 100 with the terminal 120 through the SIM card 1 may be a VoLTE service. The SIM card 2 of the terminal 100 shown in FIG. 1 or FIG. 2 may be a SIM card supporting the GSM standard; and voice communication performed by the terminal 100 with the terminal 130 through the SIM card 2 may be a circuit switched (Circuit Switched, CS) domain service.

Alternatively, both the SIM card 1 and the SIM card 2 of the terminal 100 shown in FIG. 1 or FIG. 2 may be SIM cards supporting the GSM standard. Both voice communication performed by the terminal 100 with the terminal 120 through the SIM card 1, and voice communication performed by the terminal 100 with the terminal 130 through the SIM card 2 may be CS domain services.

A data service of the terminal 100 may be performed on the SIM card 1, or may be performed on the SIM card 2; or both the SIM card 1 and the SIM card 2 of the terminal 100 can perform data service transmission of the terminal 100.

Figure 3:
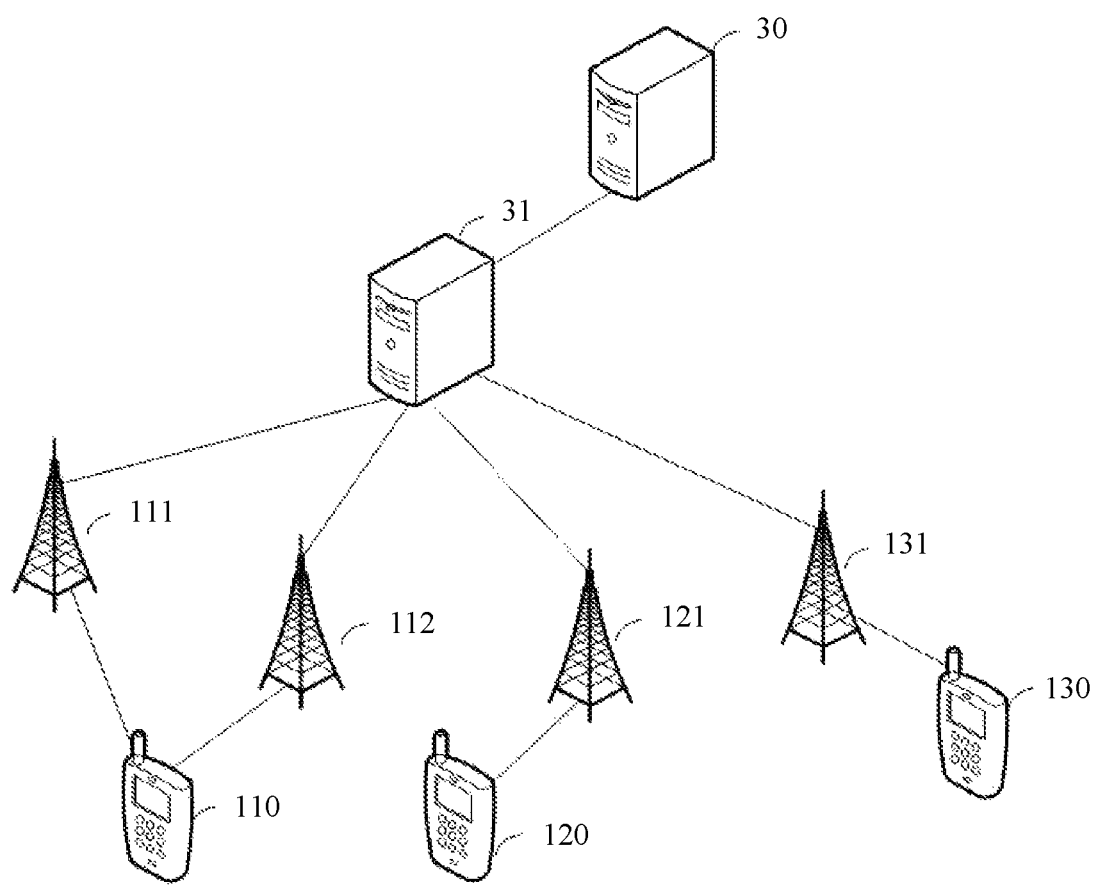
FIG. 3 is a schematic structural diagram of a communications system according to an embodiment of this application.

When each of the SIM card of the terminal 100, a SIM card of the terminal 120, and a SIM card of the terminal 130 is an SIM card supporting the LTE standard, FIG. 3 shows a structure of a communications system according to an embodiment of this application. As shown in FIG. 3, the communications system includes a serving gateway (Serving GW, SGW) 30, a mobility management entity (Mobility Management Entity, MME) 31 connected to the SGW 30 through a network, at least one evolved NodeB (evolved Node B, eNB) connected to the MME 31 through a network, and at least one terminal connected to each eNB. With reference to FIG. 2, FIG. 3 shows an eNB 111, an eNB 112, an eNB 121, and an eNB 131. The terminal 100 is connected to both the eNB 111 and the eNB 112; the terminal 120 is connected to the eNB 121; and the terminal 130 is connected to the eNB 131.

The SGW 30 is mainly responsible for user plane processing, is responsible for functions such as data packet routing and forwarding, and supports switching between different 3rd Generation Partnership Project (3rd Generation Partnership Project, 3GPP) access technologies. Each terminal related to an evolved packet system (Evolved Packet System, EPS) is served by one SGW at one time point. The MME 31 is mainly responsible for functions such as mobility management, bearer management, user authentication, and SGW selection.

The SIM card 2 of the terminal 100 is used as an example. When there is downlink data or downlink signaling for the SIM card 2 of the terminal 100 on a network side, and the SIM card 2 of the terminal 100 establishes no radio connection link to the network side, the SGW 30 sends, to the MME 31, a first message carrying first information used to indicate a priority of the SIM card 2 of the terminal 100 (for example, the first message is a downlink data notification (Downlink Data Notification, DDN) message, a create bearer request (Create Bearer Request), or an update bearer request (Update Bearer Request)), to instruct the MME 31 to send a notification message to a base station (such as the eNB 112) in a TA list of the SIM card 2 of the terminal 100. After receiving the first message carrying the first information, the MME 31 determines the priority of the SIM card 2 of the terminal 100 based on the first information, and when the priority of the SIM card 2 of the terminal 100 is greater than a preset level, sends, to the eNB 112, a notification message carrying a third identifier (the third identifier indicates a second service). After receiving the notification message carrying the third identifier, the eNB 112 sends, to the terminal 100, a paging request carrying a first identifier (the first identifier indicates the second service), to request to establish a second communication connection related to the SIM card 2 of the terminal 100. Correspondingly, when determining that the paging request carries the first identifier, the terminal 100 responds to the paging request.

It should be noted that the terminal in the communications system shown in FIG. 3 may alternatively be a terminal including only one SIM card interface, namely, a terminal in which only one SIM card is installed.

For a terminal (such as a terminal A) in which only one SIM card is installed, when there is downlink data or downlink signaling for the terminal A on the network side, and the terminal A establishes no radio connection link to the network side, the SGW 30 sends, to the MME 31, a first message carrying first information used to indicate a priority of the terminal A, to instruct the MME 31 to send a notification message to a base station in a TA list of the terminal A. After receiving the first message carrying the first information, the MME 31 determines the priority of the terminal A based on the first information, and when the priority of the terminal A is greater than the preset level, the MME 31 sends, to the base station in the TA list of the terminal A, the notification message carrying the third identifier. After receiving the notification message carrying the third identifier, the base station preferentially pages the terminal A.

Figure 4:
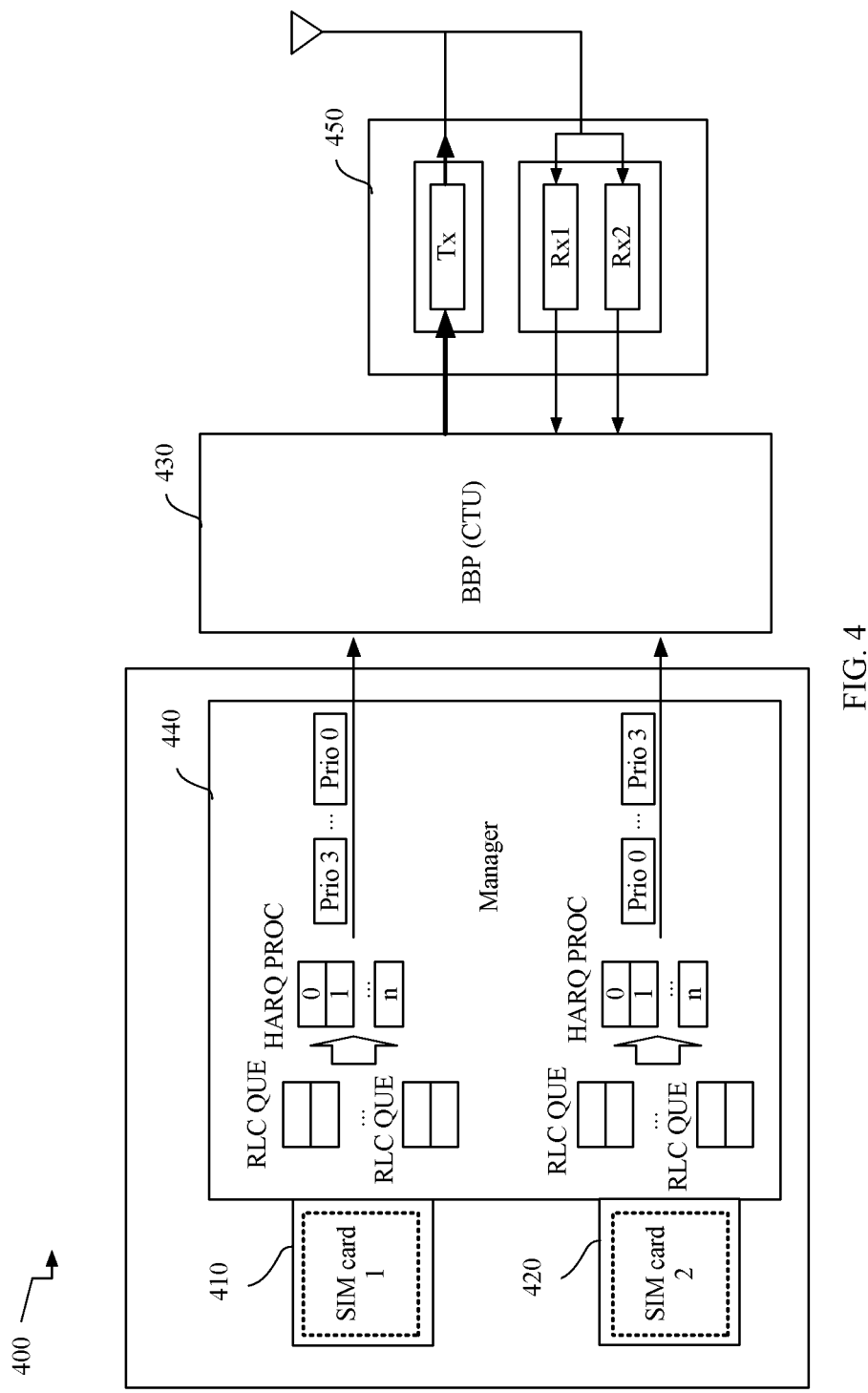
FIG. 4 is a schematic structural diagram of a terminal supporting DR-DSDS in an LTE network according to an embodiment of this application.

FIG. 4 shows a structure of a terminal supporting DR-DSDS in an LTE network according to an embodiment of this application. As shown in FIG. 4, the terminal 400 may include a first SIM card interface 410, a second SIM card interface 420, a manager 440 coupled to the first SIM card interface 410 and the second SIM card interface 420, a BBP 430 (namely, a processor) coupled to the manager 440, and a transceiver 450 connected to the BBP 430.

As shown in FIG. 4, the transceiver 450 includes a radio frequency Rx1 channel, a radio frequency Rx2 channel, and a radio frequency Tx channel. The first SIM card interface 410 is configured to: install a SIM card 1, and communicate with the SIM card 1; and the second SIM card interface 420 is configured to: install a SIM card 2, and communicate with the SIM card 2.

The BBP 430 includes a common time unit (Common Time Unit, CTU). The CTU includes an arbiter configured to determine a transmit priority of an uplink data packet.

In an example, in the LTE network, the terminal 400 may send an uplink data packet to a network device by using a hybrid automatic repeat request (Hybrid Automatic Repeat reQuest, HARQ) protocol. In this way, even if an uplink data packet of the SIM card (such as the SIM card 2) that is sent by the manager 440 to the BBP 430 is not transmitted in time, the uplink data packet can be retransmitted based on the HARQ protocol.

As shown in FIG. 4, the manager 440 may send an uplink data packet (prio) in a radio link control protocol (Radio Link Control, RLC) queue of the SIM card 1 and the SIM card 2 to the BBP 430 by using the HARQ protocol. The BBP 430 may receive various data packets sent by the manager 440, for example, an uplink voice packet sent by the SIM card 1 and an uplink signaling packet sent by the SIM card 2. The BBP 430 occupies, based on a transmit priority of each uplink data packet on a radio frequency Tx channel, a radio frequency Tx channel, to send the uplink data packet to the network device.

For example, the terminal supporting DR-DSDS in this embodiment of this application may be a communications device in which at least two SIM cards can be installed and that can perform voice communication with another communications terminal by using any one of the at least two SIM cards. For example, the terminal may be a dual card dual standby mobile phone, a smart band in which two SIM cards can be installed, a smartwatch, or a tablet computer. A specific form of the terminal is not particularly limited in this embodiment of this application.

Figure 5:
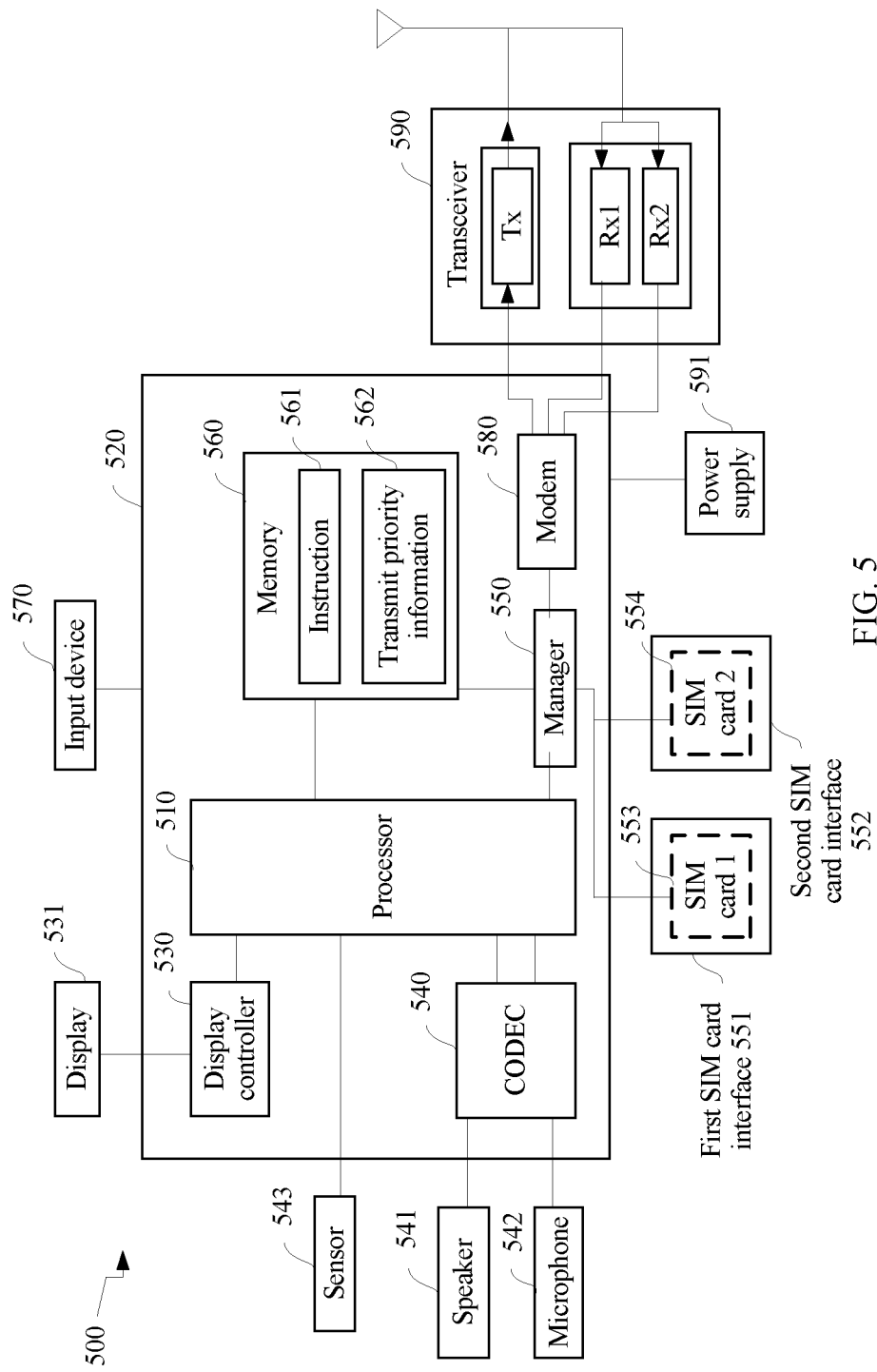
FIG. 5 is a schematic diagram of a hardware structure of a mobile phone according to an embodiment of this application.

A mobile phone is used as an example in the following embodiments to describe how the terminal supporting DR-DSDS implements specific technical solutions in the embodiments. As shown in FIG. 5, the terminal in an embodiment may be a mobile phone 500. The mobile phone 500 is used as an example to describe the embodiment in detail.

It should be understood that the mobile phone 500 shown in the figure is merely an example of the terminal supporting DR-DSDS. In addition, the mobile phone 500 may have more or fewer components than those shown in the figure, may combine two or more components, or may have different component configurations. The components shown in FIG. 5 may be implemented in hardware, software, or a combination of hardware and software including one or more signal processing and/or application-specific integrated circuits.

As shown in FIG. 5, the mobile phone 500 includes a processor 510, a system-on-chip device 520, a display controller 530, a codec (CODEC) 540, a manager 550, a memory 560, an input device 570, a modem 580, a transceiver 590, a power supply 591, and the like.

A person skilled in the art may understand that a structure of the mobile phone shown in FIG. 5 does not constitute a limitation on the mobile phone, and the mobile phone may include more or fewer components than those shown in the figure, combine some components, or have different component arrangements.

As shown in FIG. 5, the mobile phone 500 may further include a first SIM card interface 551 and a second SIM card interface 552. The first SIM card interface 551 is configured to communicate with a SIM card 1 553; and the second SIM card interface 552 is configured to communicate with a SIM card 2 554. For example, the first SIM card interface 551 and the second SIM card interface 552 may be SIM card connectors that each include a body with a SIM card accommodation space and a plurality of connection slots for receiving a conductive terminal of a received SIM card. Electrical signaling may be exchanged with the SIM card through the conductive terminal and the slot. An example interface may include a serial or parallel (for example, 6-pin or 8-pin) connection. In addition, a plurality of SIM card sizes (for example, a full-sized SIM, a mini SIM, or a micro SIM) may be provided. In another embodiment, when a plurality of types of subscriptions are associated with a universal identity module (for example, a universal SIM), the mobile phone 500 may not include a plurality of SIM card interfaces. The manager 550 is configured to manage the SIM card 1 553 and the SIM card 2 554.

As shown in FIG. 5, the mobile phone 500 may further include a speaker 541 and a microphone 542 that are coupled to the codec 540. Further, FIG. 5 indicates that the manager 550 may be coupled to the processor 510 and coupled to the modem 580 that communicates with the transceiver 590. The transceiver 590 is connected to one or more antennas. FIG. 5 shows an example of only one antenna.

In a particular embodiment, the transceiver 590 is connected to a plurality of antennas, and the modem 580 supports a diversity. One of the plurality of antennas is a primary antenna, and other antenna are secondary antennas.

The transceiver 590 may be an RF circuit. The RF circuit may be configured to send and receive a signal in an information sending or receiving process or a call process, and may receive downlink information from a base station, and then deliver the downlink information to the processor 510 for processing. In addition, the RF circuit may send related uplink data to the base station. Generally, the RF circuit includes, but is not limited to, devices such as an antenna, at least one amplifier, a transceiver, a coupler, a low noise amplifier, and a duplexer. In addition, the RF circuit may communicate with a network and another mobile device through wireless communication. The wireless communication may use any communication standard or protocol that includes, but is not limited to, a global system for mobile communications, a general packet radio service, code division multiple access, wideband code division multiple access, long term evolution, an email, a short message service, and the like. In this embodiment of this application, the transceiver 590 shown in FIG. 5 may include two radio frequency Rx channels and one radio frequency Tx channel (a radio frequency Tx channel, a radio frequency Rx1 channel, and a radio frequency Rx2 channel shown in FIG. 5).

The memory 560 may be configured to store a software program and data. The processor 510 runs the software program and the data stored in the memory 560, to perform various functions and data processing of the mobile phone 500. For example, as shown in FIG. 5, the memory 560 stores an instruction 561 and transmit priority information 562. The instruction 561 may be executed by the processor 510. For example, the instruction 561 may be executed by the processor 510, to receive, at a primary signal input end of the modem 580, an instruction for communication data related to the SIM card 1 553. The "communication data related to the SIM card 1 553" may be routed to the primary signal input end (not shown in FIG. 5) of the modem 580 through a primary RF path, namely, Rx1 of the transceiver 590. The instruction 561 may be executed by the processor 510, to receive, at a secondary signal input end of the modem 580, an instruction for communication data related to the SIM card 2 554. The "communication data related to the SIM card 2 554" may be routed to the secondary signal input end (not shown in FIG. 5) of the modem 580 through a secondary RF path, namely, Rx2 of the transceiver 590.

The memory 560 may mainly include a program storage area and a data storage area. The program storage area may store an operating system, an application program required by at least one function (such as a sound playback function and an image display function), and the like. The data storage area may store data (such as audio data and an address book) created based on use of the mobile phone 500, and the like. In addition, the memory 560 may include a high-speed random access memory, and may further include a non-volatile memory, for example, at least one disk storage device, a flash memory device, or another volatile solid-state storage device. In the following embodiments, the memory 560 stores an operating system that can enable the mobile phone 500 to run, for example, an iOS® operating system developed by Apple Inc., an Android® open source operating system developed by Google Inc., or a Windows® operating system developed by Microsoft Corporation.

The input device 570 (such as a touchscreen) may be configured to: receive input digit or character information; and generate a signal input related to a user setting and function control of the mobile phone 500. Specifically, the input device 570 may include a touch panel disposed at the front of the mobile phone 500. The touch panel may collect a touch operation of a user on or near the touch panel (such as an operation performed by the user on or near the touch panel by using any proper object or accessory such as a finger or a stylus), and drive a corresponding connection apparatus based on a preset program. Optionally, the touch panel may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel may be implemented by using various types such as a resistive type, a capacitive type, an infrared type, and a surface sound wave type.

A display 531 (namely, a display screen) may be configured to display information entered by the user or information provided for the user, and graphical user interfaces (Graphical User Interface, GUI) of various menus of the mobile phone 500. The display 531 may include the display panel disposed at the front of the mobile phone 500. The display panel may be configured in a form of a liquid crystal display, an organic light-emitting diode, or the like.

After detecting a touch operation performed on or near the touch panel, the touch panel transfers the touch operation to the processor 510 to determine a touch event, and then the processor 510 provides corresponding visual output on the display panel based on a type of the touch event. Although, in FIG. 5, the touch panel and the display panel are used as two independent parts to implement input and output functions of the mobile phone 500, in some embodiments, the touch panel and the display panel may be integrated to implement the input and output functions of the mobile phone 500. The integrated touch panel and display panel may be referred to as a touch display screen.

In some other embodiments, the touch panel may be further provided with a pressure sensing sensor. In this way, when the user performs a touch operation on the touch panel, the touch panel can further detect pressure of the touch operation, and then the mobile phone 500 can more accurately detect the touch operation.

The mobile phone 500 may further include at least one sensor 543, such as an optical sensor, a motion sensor, and other sensors. Specifically, optical sensors may include an ambient light sensor and a proximity sensor. The ambient light sensor may adjust luminance of the display panel based on brightness of ambient light. The optical proximity sensor may be disposed at the front of the mobile phone 500, and when the mobile phone 500 is moved to the ear, the mobile phone 500 switches off a power supply of the display panel based on detection of the optical proximity sensor. In this way, electricity of the mobile phone 500 can be further saved. As one type of motion sensor, an accelerometer sensor may detect magnitude of accelerations in various directions (generally on three axes), may detect magnitude and a direction of the gravity when the mobile phone stays still, and may be applied to an application that recognizes a posture of the mobile phone (for example, switching between landscape orientation and portrait orientation, a related game, and magnetometer posture calibration), a function related to vibration recognition (such as a pedometer and a knock), and the like. For other sensors such as a gyroscope, a barometer, a hygrometer, a thermometer, and an infrared sensor that may be further configured for the mobile phone 500, details are not described herein.

The codec 540, the speaker 541, and the microphone 542 may provide an audio interface between the user and the mobile phone 500. The codec 540 may convert received audio data into an electrical signal and transmit the electrical signal to the speaker 541. The speaker 541 converts the electrical signal into a sound signal for output. In addition, the microphone 542 converts a collected sound signal into an electrical signal, and the codec 540 receives the electrical signal and converts the electrical signal into audio data, and then outputs the audio data to the RF circuit 510 to send the audio data to, for example, another mobile phone or output the audio data to the memory 560 for further processing.

The processor 510 is a control center of the mobile phone 500, and is connected to various parts of the mobile phone by using various interfaces and lines. By running or executing the software program stored in the memory 560, and invoking the data stored in the memory 560, the processor 510 performs various functions and data processing of the mobile phone 500, to perform overall monitoring on the mobile phone. In some embodiments, the processor 510 may include one or more processing units. The processor 510 may further integrate an application processor and a modem processor. The application processor mainly processes an operating system, a user interface, an application program, and the like. The modem processor mainly processes wireless communication. It may be understood that the modem processor may not be integrated into the processor 510.

The mobile phone 500 may further include a Bluetooth module and a Wi-Fi module. The Bluetooth module is configured to exchange information with another device by using a short-distance communication protocol such as Bluetooth. For example, the mobile phone 500 may establish, by using the Bluetooth module, a Bluetooth connection to a wearable device (such as a smartwatch) having a Bluetooth module, to exchange data. Wi-Fi is a short-distance wireless transmission technology. The mobile phone 500 may help, by using the Wi-Fi module, the user send and receive an email, browse a web page, access stream media, and the like. Wi-Fi provides wireless broadband Internet access for the user.

The mobile phone 500 further includes the power supply 591 (such as a battery) that supplies power to each component. The power supply may be logically connected to the processor 510 by using a power management system, thereby implementing functions such as charging, discharging, and power consumption management by using the power management system. It may be understood that, in the following embodiments, the power supply 591 may be configured to supply power to the display panel and the touch panel. All methods in the following embodiments can be implemented in the mobile phone 500 having the foregoing hardware structure.

Figure 6:
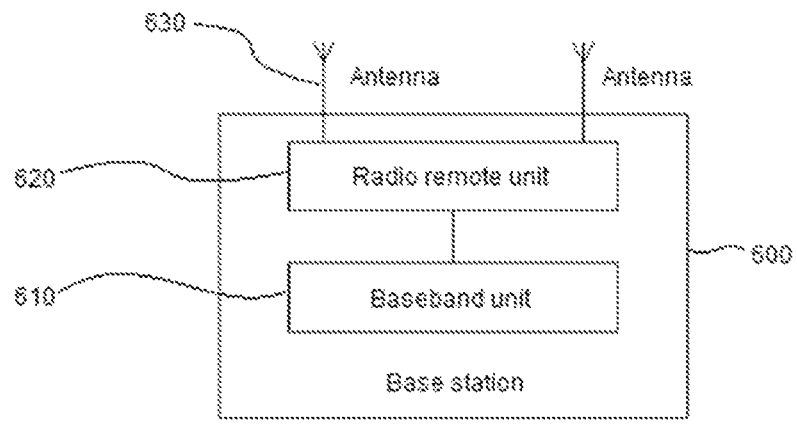
FIG. 6 is a schematic structural diagram of a base station according to an embodiment of this application.

A radio access network device communicating with the terminal supporting DR-DSDS in this embodiment of this application may be a base station 600. Components of the base station 600 are described in detail below with reference to FIG. 6. As shown in FIG. 6, the base station includes a baseband unit (Base Band Unit, BBU) 610, a radio remote unit (Radio Remote Unit, RRU) 620, and an antenna 630. The BBU 610 may be connected to the RRU by using an optical fiber, and then the RRU 620 is connected to the antenna by using a coaxial cable and a power splitter (a coupler). Usually, one BBU 610 may be connected to a plurality of RRUs.

The RRU 620 may include four modules: a digital intermediate frequency module, a transceiver module, a power amplification module, and a filtering module. The digital intermediate frequency module is configured for modulation and demodulation in optical transmission, digital up- and down-frequency conversion, digital-to-analog conversion, and the like. The transceiver module completes conversion from an intermediate frequency signal into a radio frequency signal; and then the radio frequency signal is amplified by the power amplification module and filtered by the filtering module and transmitted by using the antenna.

The BBU 610 is configured to complete baseband processing functions (encoding, multiplexing, modulation, and spreading) of a Uu interface (namely, an interface between the terminal device and the base station), an interface function of a logical interface between a radio network controller (Radio Network Controller, RNC) and the base station, signaling processing, local and remote operation and maintenance functions, and working status monitoring and alarm information reporting function of a base station system.

Figure 7:
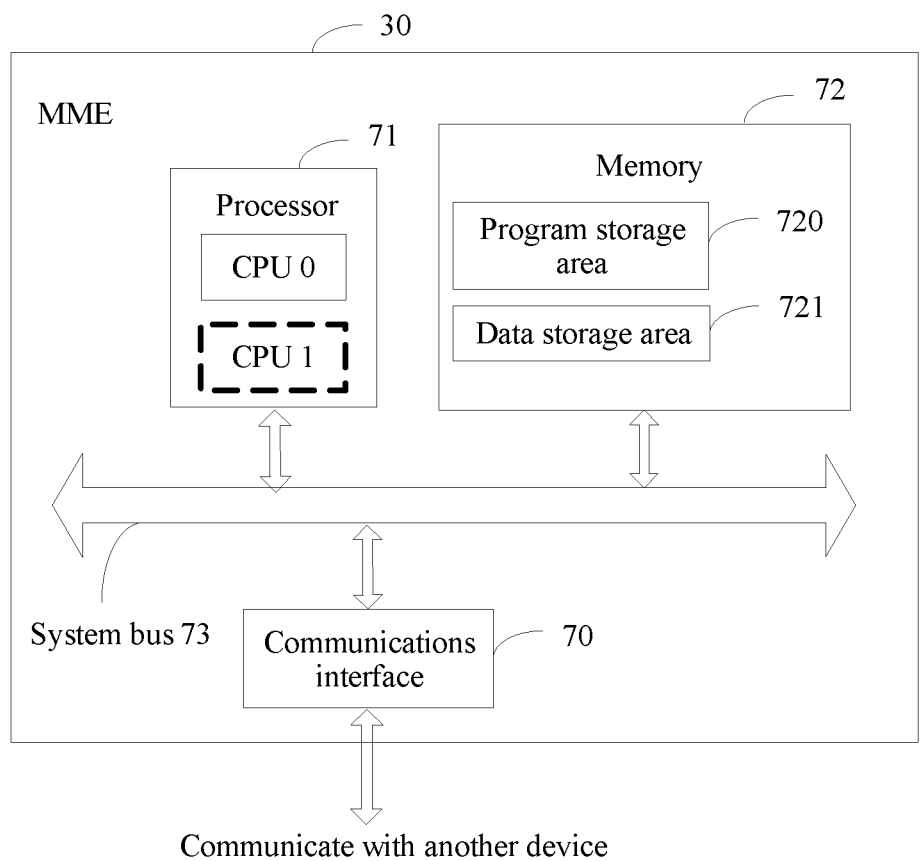
FIG. 7 is a first schematic structural diagram of an MME according to an embodiment of this application.

As shown in FIG. 7, the MME 30 in FIG. 3 includes a communications interface 70, a processor 71, and a memory 72. The communications interface 70, the processor 71, and the memory 72 are connected to each other by using a system bus 73, and complete mutual communication.

The communications interface 70 is configured to communicate with another device or communications network such as the Ethernet or a WLAN.

The memory 72 is configured to store a context of the terminal, and may be further configured to store a software program and an application module. The processor 71 runs the software program and the application module stored in the memory 72, to perform various functional applications and data processing of the MME 30.

The memory 72 may mainly include a program storage area 720 and a data storage area 721. The program storage area 720 may store an operating system and an application program required by at least one function, for example, sending of a notification message. The data storage area 721 may store the context of the terminal.

The memory 72 may include a volatile memory (Volatile Memory), for example, a random access memory (Random-Access Memory, RAM); or the memory may include a non-volatile memory (non-volatile memory), for example, a read-only memory (Read-Only Memory, ROM), a flash memory (Flash Memory), a hard disk drive (Hard Disk Drive, HDD), a solid-state drive (Solid-State Drive, SSD), a magnetic disk storage medium or another magnetic storage device, or any other medium that can be configured to carry or store expected program code in a form of an instruction or a data structure and that can be accessed by a remote device. However, this is not limited thereto.

The memory 72 may exist independently and be connected to the processor 71 by using the system bus 73. Alternatively, the memory 72 may be integrated with the processor 71.

The processor 71 is a control center of the MME 30. The processor 71 is connected to various parts of the MME 30 by using various interfaces and lines. By running or executing the software program and/or the application module stored in the memory 72, and invoking data stored in the memory 72, the processor 71 performs various functions and data processing of the MME 30, to perform overall monitoring on the MME 30.

During specific implementation, in an embodiment, the processor 71 may include one or more CPUs; for example, the processor 71 in FIG. 7 includes a CPU 0 and a CPU 1.

The system bus 73 may be a peripheral component interconnect (English: Peripheral Component Interconnect, PCI for short) bus, an extended industry standard architecture (English: Extended Industry Standard Architecture, EISA for short) bus, or the like.

The system bus 73 may be classified into an address bus, a data bus, a control bus, and the like. In this embodiment of this application, for clear description, various buses in FIG. 7 are all illustrated as the system bus 73.

A communication method for implementing dual SIM dual active provided in an embodiment of this application is described in detail below.

Figure 8A:
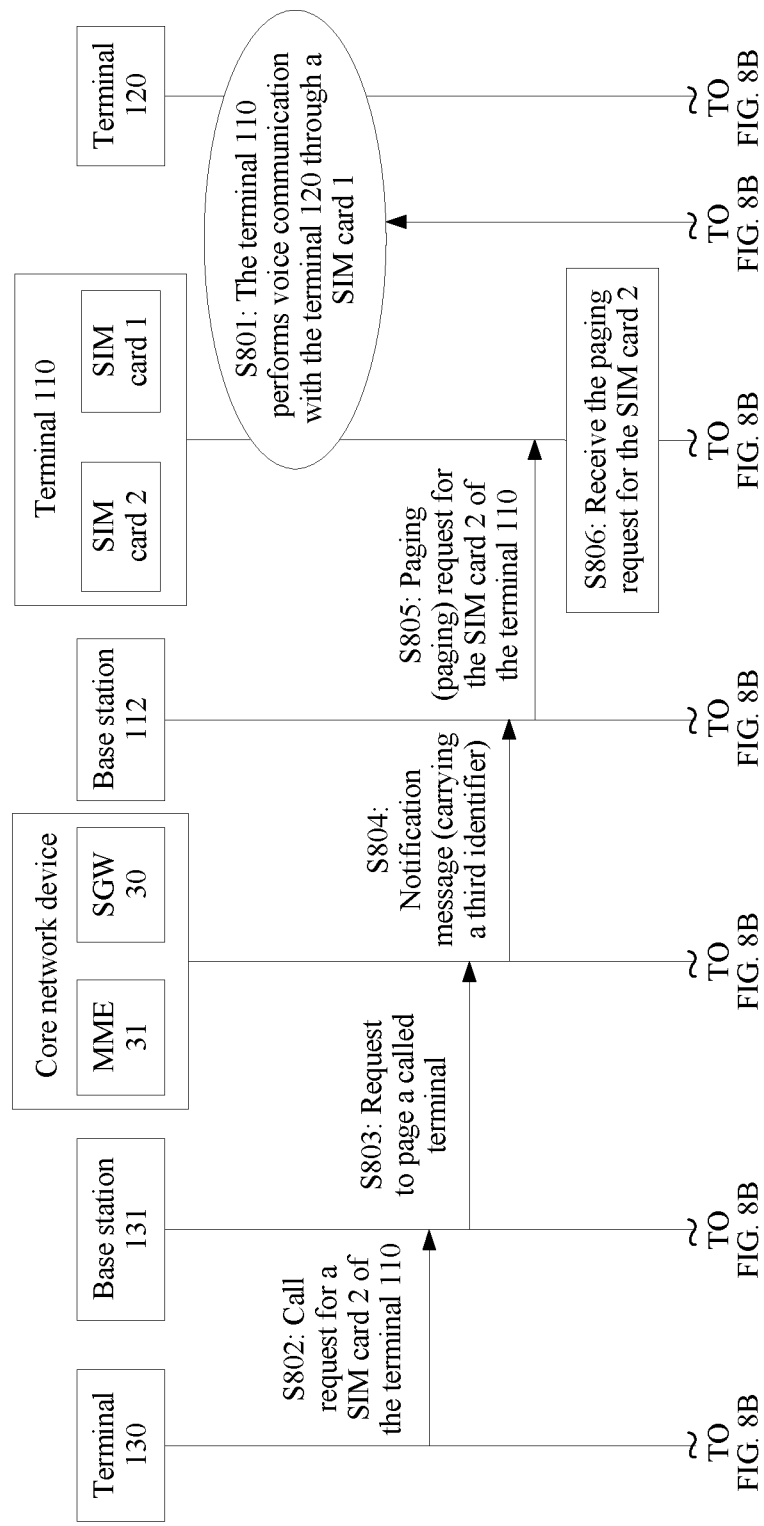
FIG. 8A and FIG. 8B are a first flowchart of a communication method for implementing dual SIM dual active according to an embodiment of this application.
Figure 8B:
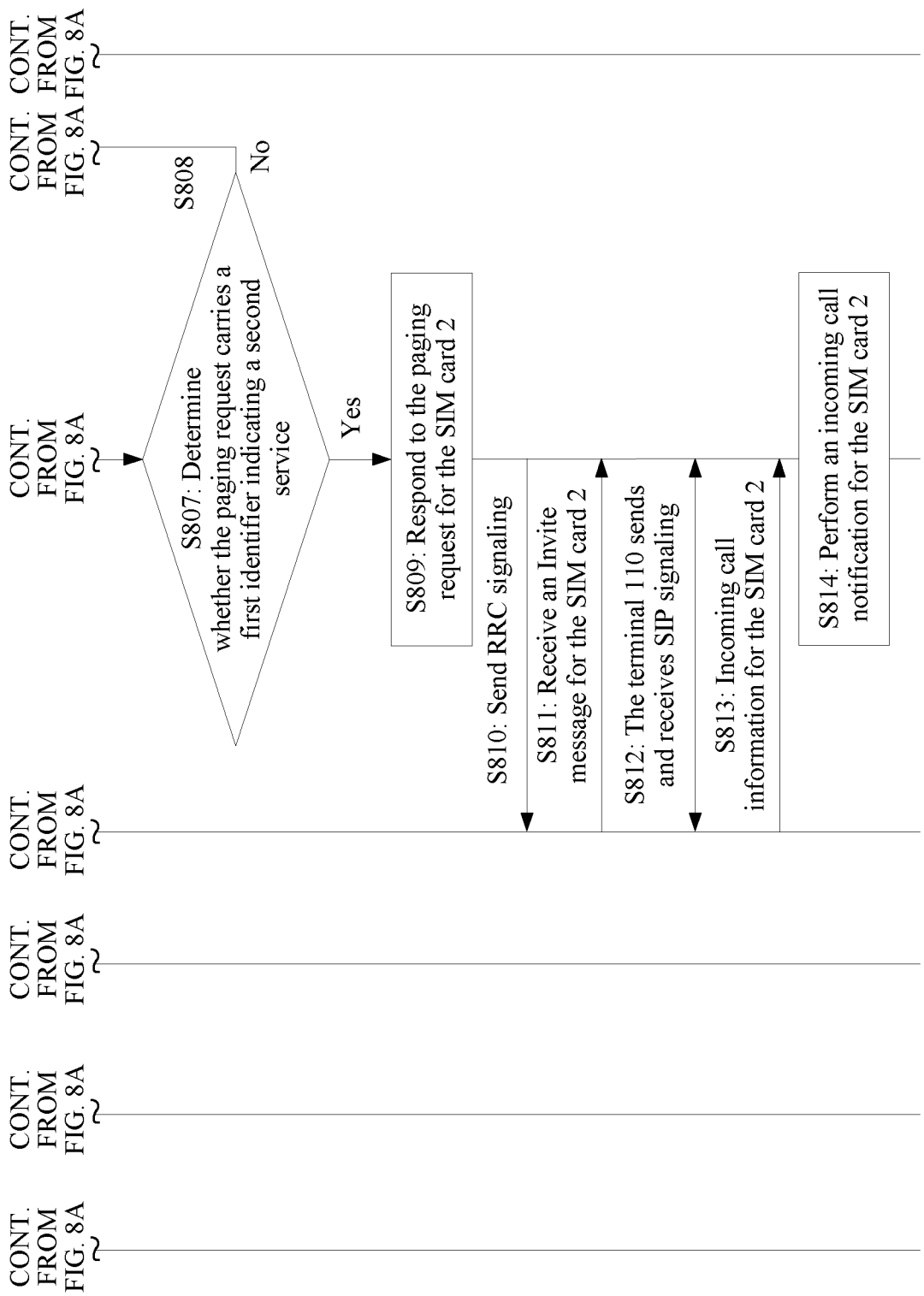

FIG. 8A and FIG. 8B are a schematic flowchart of a communication method for implementing dual SIM dual active according to an embodiment of this application. The communication method for implementing dual SIM dual active may be applied to the application scenario shown in FIG. 2 or the communications system shown in FIG. 3.

In this embodiment, the application scenario shown in FIG. 2, and that a radio access network device is an eNB, and both a first service and a second service are voice calls are used as an example for description. In this case, a first communication connection is a voice call related to a SIM card 1, and a second communication connection is a voice call related to a SIM card 2.

As shown in FIG. 8A and FIG. 8B, a communication method for implementing dual SIM dual active provided in this embodiment of this application is described as follows:

S801: The terminal 100 performs voice communication with the terminal 120 through the SIM card 1.

It may be understood that, in a process in which the terminal 100 performs the voice communication with the terminal 120 through the SIM card 1 (that is, when the terminal 100 is in the first communication connection), because the SIM card 1 of the terminal 100 is in a call state, the terminal 100 sends a voice packet of the first communication connection to the base station 111. Therefore, the SIM card 1 of the terminal 100 occupies the radio frequency Tx resource (namely, the radio frequency Tx channel) in the terminal 100 by using the processor.

S802: The terminal 130 sends, to the base station 131, a call request for calling the SIM card 2 of the terminal 100.

S803: After receiving the call request in S802, the base station 131 requests a core network device to page a called terminal (namely, the SIM card 2 of the terminal 100).

Specifically, after receiving the call request, the base station 131 forwards the call request to the SGW 30 through the MME 31.

S804: The core network device sends, to the base station 112, a notification message carrying a third identifier, where the notification message is used to instruct the base station 112 to page the SIM card 2 of the terminal 100.

Specifically, after receiving the call request and determining that the SIM card 2 of the terminal 100 establishes no radio connection link to the network side, the SGW 30 sends, to the MME 31, a first message carrying first information used to indicate a priority of the SIM card 2 of the terminal 100 (the first message in this embodiment of this application may be a create bearer request), to instruct the MME 31 to send a notification message to a base station (such as the eNB 112) in a TA list of the SIM card 2 of the terminal 100. Herein, the first information may be an allocation and retention priority (Allocation and Retention Priority, ARP).

After receiving the first message carrying the first information, the MME 31 determines, based on the first information, whether the priority of the SIM card 2 of the terminal 100 is higher than a preset level. If the priority of the SIM card 2 of the terminal 100 is higher than the preset level, the MME 31 sends, to the base station 112, the notification message carrying the third identifier, to instruct the base station 112 to page the SIM card 2 of the terminal 100, and establish a connection to a second service of the SIM card 2 of the terminal 100. Herein, the third identifier is used to indicate the second service. The second service in this embodiment of this application may be a voice call, or may be a data service. This is not specifically limited in this embodiment of this application. An example in which the second service is a voice call is used in the embodiment shown in FIG. 8A and FIG. 8B.

Optionally, the notification message (a message sent by the MME to the base station in this embodiment of this application) carrying the third identifier in this embodiment of this application may be modified based on a message sent by an MME to a base station and described in the existing 3GPP 36.413 protocol 9.1.6.

For example, the notification message carrying the third identifier in this embodiment of this application is shown in Table 1. In the message sent by the MME to the base station and described in the existing 3GPP 36.413 protocol 9.1.6, a paging priority (Paging Priority) is optional (Option, O), and a value and corresponding descriptions of the paging priority are not provided. In the notification message carrying the third identifier in this embodiment of this application, the paging priority is mandatory (Mandatory, O), the value of the paging priority is a priority level of a paging object, and a smaller value of a paging priority of a terminal indicates a higher paging priority of the terminal.

TABLE 1

| Option name (IE/Group Name) | Optionality (Presence) | Range (Range) | Semantic description (Semantics description) |
| --- | --- | --- | --- |
| Message type (Message Type) | Mandatory (M) | | |
| Terminal identity (UE Identity Index value) | M | | |
| Terminal paging identity (UE Paging Identity) | M | | |

TABLE 1-continued

| Option name (IE/Group Name) | Optionality (Presence) | Range (Range) | Semantic description (Semantics description) |
|---|---|---|---|
| Paging DRX (Paging DRX) | Optional (O) | | |
| Core network domain (CN Domain) | M | | |
| TAI list (List of TAIs) | | 1 | |
| TAI list item (>TAI List Item) | | 1 ... <maxnoofTAIs> //1 to maxnoofTAIs | |
| >>TAI | M | | |
| Closed user group identifier list (CSG Id List) | | 0, . . . , 1 | |
| Closed user group identifier (>CSG Id) | | 1 ... <maxnoofCSGId> //1 to maxnoofCSGId | |
| Paging priority (Paging Priority) | M | ENUMERATED(PrioLevel1, PrioLevel2, PrioLevel3, . . .) //Enumerated (priority 1, priority 2, priority 3, . . .) | Lower value codepoint indicates higher priority //A smaller value indicates a higher priority. |
| Terminal radio capability for paging (UE Radio Capability for Paging) | O | | |

It should be noted that, in addition to the content shown in Table 1, the notification message carrying the third identifier may further include other content, for example, assigned criticality (Assigned Criticality).

With reference to Table 1, when the second service indicates a voice call, the third identifier in this embodiment of this application may be PrioLevel=1; or when the second service indicates a data service, the third identifier in this embodiment of this application may be PrioLevel=2.

S805: After receiving the notification message sent by the core network device, the base station 112 sends a paging (paging) request to the terminal 100.

Specifically, when the notification message sent by the core network device carries the third identifier, the base station 112 sends, to the terminal 100 based on the notification message, the paging request carrying a first identifier used to indicate the second service. The paging request is used to request to establish a connection to the second service of the SIM card 2 of the terminal 100.

Optionally, the paging request carrying the first identifier in this embodiment of this application may be modified based on a paging message described in the existing 3GPP 36.331 protocol.

For example, when the second service is a voice call, the paging request carrying the first identifier in this embodiment of this application is as follows:

```
-- ANS1Start
Paging ::= SEQUENCE {
pagingRecordList PagingRecordList OPTIONAL, -- Need ON
systemInfoModification ENUMERATED{true} OPTIONAL, -- Need ON
etws-Indication ENUMERATED{true} OPTIONAL, -- Need ON
nonCriticalExtension Paging-v890-IEs OPTIONAL
}
//Performing paging based on at least one of {paging list (pagingRecordLis), non-
critical extension (nonCriticalExtension)}
    Paging-v890-IEs ::= SEQUENCE {
    lateNonCriticalExtension OCTET STRING OPTIONAL,
    nonCriticalExtension Paging-v920-IEs OPTIONAL
    }
    //At least one of late non-critical extension (lateNonCriticalExtension) and non-critical
extension
        Paging-v920-IEs ::= SEQUENCE {
        cmas-Indication-r9 ENUMERATED {true} OPTIONAL, -- Need ON
        nonCriticalExtension Paging-v1130-IEs OPTIONAL
        }
```

-continued

```
//At least one of cmas-Indication-r9 and non-critical extension
Paging-v1130-IEs ::= SEQUENCE {
eab-ParamModification-r11 ENUMERATED{true} OPTIONAL, -- Need ON
nonCriticalExtension Paging-v13xx-IEs OPTIONAL
}
//At least one of eab-ParamModification-r11 and non-critical extension
Paging-v13xx-IEs ::= SEQUENCE {
Redistribution Indication-r13 ENUMERATED{true} OPTIONAL, --Need ON
System InfoModification-eDRX-r13 ENUMERATED{true} OPTIONAL, -- Need ON
call indication ENUMERATED{true} OPTIONAL, -- Need ON
nonCriticalExtension SEQUENCE{ } OPTIONAL
}
//Including a redistribution indication (Redistribution Indication), a system information
modification indication (System InfoModification), a voice call indication (call indication), and
non-critical extension
    PagingRecordList ::= SEQUENCE(SIZE(1..maxPageRec))OF PagingRecord
    //A paging list (PagingRecordList) is a paging record that has a length of maxPageRec.
    ...
    -- ASN1STOP
```

It can be learned that, in this example, the first identifier in this embodiment of this application is indicated by a "call indication". When Paging-v13xx-IEs includes the "call indication," it indicates that the paging request carries the first identifier.

When the notification message sent by the core network device does not carry the third identifier, the base station 112 sends an existing paging request to the terminal 100 according to a stipulation in an existing protocol.

S806: The terminal 100 receives the paging request for the SIM card 2 that is sent by the base station 112.

In S801 in this embodiment, the terminal 100 already performs the voice communication with the terminal 120 through the SIM card 1. The terminal 100 occupies the radio frequency Rx1 channel in the terminal 100 to perform the voice communication with the terminal 120 through the SIM card 1, so that the terminal 100 can receive the paging request for the SIM card 2 through the radio frequency Rx2 channel.

The paging request for the SIM card 2 is a paging request for establishing a second communication connection. The second communication connection is related to the SIM card 2. Usually, the paging request for the SIM card 2 may be a voice paging request, or may be a paging request of another service. For example, the paging request for the SIM card 2 may be a paging request of a short message service.

S807: The terminal 100 determines whether the paging (paging) request carries a first identifier used to indicate a second service.

Usually, after receiving the paging request, the terminal may send RRC signaling to the base station in response to the paging request, to establish an RRC connection to the base station, and perform a service corresponding to the paging request. However, in a scenario in which "when the SIM card 1 of the terminal 100 is in the call state, the terminal 100 receives the paging request for the SIM card 2," if the terminal 100 occupies the radio frequency Tx channel to send the RRC signaling to the network device in response to the paging request, because the RRC signaling occupies the radio frequency Tx channel, sending of a voice packet of the SIM card 1 to be sent by the terminal 100 is delayed, and consequently, quality of voice communication of a calling card (the SIM card 1) is affected.

However, in a process of performing the voice service of the SIM card 1, the terminal 100 does not always occupy the radio frequency Tx channel to send the voice packet of the SIM card 1. That is, when the SIM card 1 is in the call state, the terminal 100 transmits no voice packet of the SIM card 1 on the radio frequency Tx channel in some idle time periods. For example, each subframe has a period of time (which is referred to as an idle time period), and the terminal 100 transmits no voice packet of the SIM card 1 on the radio frequency Tx channel in the idle time period.

For example, in this embodiment of this application, a time division duplex (Time Division Duplexing, TDD) LTE network is used as an example herein. Table 2 shows an example table of uplink-downlink timeslot configurations in the TDD-LTE network.

TABLE 2

Table of uplink-downlink timeslot configurations in the LTE network

| UL-DL Config- uration | Switch- point periodicty | Subframe number | | | | | | | | |
|---|---|---|---|---|---|---|---|---|---|---|
| | | 0 | 1 | 2 | 3 | 4 | 5 | 6 | 7 | 8 | 9 |
| UL-DL (0) | 5 ms | D | S | U | U | U | D | S | U | U | U |
| UL-DL (1) | 5 ms | D | S | U | U | D | D | S | U | U | D |
| UL-DL (2) | 5 ms | D | S | U | D | D | D | S | U | D | D |
| UL-DL (3) | 10 ms | D | S | U | U | U | D | D | D | D | D |
| UL-DL (4) | 10 ms | D | S | U | U | D | D | D | D | D | D |
| UL-DL (5) | 10 ms | D | S | U | D | D | D | D | D | D | D |
| UL-DL (6) | 5 ms | D | S | U | U | U | D | S | U | U | D |

As shown in Table 2, the TDD-LTE network may include seven uplink-downlink timeslot configurations (Uplink-Downlink Configuration, UL-DL Configuration). In the seven UL-DL configurations shown in Table 2, uplink-downlink subframe switch-point periodicities (Switch-point periodicity) of UL-DL (0), UL-DL (1), UL-DL (2), and UL-DL (6) are 5 ms, and uplink-downlink subframe switch-point periodicities of UL-DL (3), UL-DL (4), and UL-DL (5) are 10 ms. In Table 2, "U" is used to indicate a timeslot for transmitting uplink data (such as an uplink voice packet), and "D" is used to indicate a timeslot for transmitting downlink data.

It can be learned from the seven uplink-downlink timeslot configurations shown in Table 2 that uplink data (such as an uplink voice packet) is transmitted only in some timeslots (namely, uplink timeslots "U") of one subframe, and no uplink data (such as an uplink voice packet) is transmitted in other timeslots. For example, in UL-DL (2), only a timeslot 2 and a timeslot 7 are used to transmit uplink data (such as an uplink voice packet), and no uplink data is transmitted in other timeslots.

It can be learned that each subframe has a period of time (which is referred to as an idle time period), and the SIM card 1 transmits no uplink voice packet on the radio frequency Tx channel in the idle time period. Therefore, even if the SIM card 2 of the terminal 100 interacts with the base station 112 in response to the paging request in the idle time period by using the radio frequency Tx channel of the terminal 100, to establish the RRC connection, without affecting quality of the voice communication between the SIM card 1 of the terminal 100 and the terminal 120.

Therefore, to reduce impact of a response made by the terminal 100 to the paging request on the quality of the voice communication of the SIM card 1, in this embodiment, the terminal 100 may respond to the paging request only when the paging request requests to establish a voice call to the SIM card 1.

Correspondingly, after receiving the paging request for the SIM card 2 that is sent by the base station 112, the terminal 100 needs to determine whether the paging request carries the first identifier.

S808: If the paging request does not carry the first identifier, the terminal 100 maintains a voice call between the SIM card 1 and the terminal 120 (that is, the terminal 100 continues to process the first communication connection).

If the paging request does not carry the first identifier, it indicates that the paging request is not used for a voice call, and the terminal 100 may continue to maintain the voice call between the SIM card 1 and the terminal 120 instead of responding to the paging request, thereby ensuring that no interference is caused to the voice call between the SIM card 1 and the terminal 120.

S809: If the paging request carries the first identifier, the terminal 100 responds to the paging request.

S810: The terminal 100 sends RRC signaling to the base station 112 in response to the paging request, to establish an RRC connection to the base station 112 based on the SIM card 2.

Optionally, a format of the RRC signaling sent by the terminal 100 to the base station 112 in this embodiment of this application is the same as a format of existing RRC signaling.

Optionally, based on the existing RRC signaling, a second identifier is further added to the RRC signaling sent by the terminal 100 to the base station 112 in this embodiment of this application. The second identifier is used to indicate that the terminal 100 actively requests to establish a voice call link. In this scenario, a network side device preferentially establishes a voice call link to the terminal 112, thereby improving a call completion rate of the SIM card 2 of the terminal device 110.

For example, the RRC signaling sent by the terminal 100 to the network device in this embodiment of this application is an RRC connection request. The RRC connection request is as follows:

```
-- ASN1START
RRC Connection Request ::= SEQUENCE {
criticalExtensions CHOICE {
rrcConnectionRequest-r8 RRCConnectionRequest-r8-IEs,
criticalExtensionsFuture SEQUENCE { }
}
}
RRCConnectionRequest-r8-IEs ::= SEQUENCE {
ue-Identity InitialUE-Identity,
establishmentCause EstablishmentCause,
spare BIT STRING (SIZE (1))
}
```

-continued

```
InitialUE-Identity ::= CHOICE {
s-TMSI S-TMSI,
randomValue BIT STRING (SIZE (40))
}
EstablishmentCause ::= ENUMERATED {
Emergency, highPriorityAccess, mt-Access, mo-Signalling, mo-Data,
delayTolerantAccess-v1020, mo-VoiceCall-v1280, mt-Voicecall, spare1}
//An establishment cause (EstablishmentCause) includes an
emergence (Emergency) connection, a high priority access
(highPriorityAccess), downlink access (mt-Access), uplink signaling
(mo-Signaling), uplink data (mo-Data), delay tolerance
(delayTolerantAccess), an active request of a paging end (mo-VoiceCall),
and an active request of a paged end (mt-Voicecall).
-- ASN1STOP
```

In this example, the second identifier in this embodiment of this application is indicated by "mt-Voicecall". If the EstablishmentCause includes "mt-Voicecall," it indicates that the terminal 100 actively requests to establish the voice call link.

S811: The terminal 100 receives an invite (Invite) message for the SIM card 2 that is sent by the base station 112.

The terminal 100 sends the RRC signaling to the base station 112 only after determining that the paging request carries the first identifier. Therefore, the base station 112 may send the Invite message (namely, an Invite message for the second communication connection) to the terminal 100.

S812: The terminal 100 exchanges SIP signaling with the base station 112.

S813: The terminal 100 receives incoming call information for the SIM card 2 that is sent by the base station 112.

After the terminal 100 obtains the incoming call information from the base station 112, the method in some embodiments of this application may further include S814.

S814: The terminal 100 performs an incoming call notification for the SIM card 2.

For example, the performing, by the terminal 100, an incoming call notification includes: performing, by the terminal 100, the incoming call notification in one or more of the following notification modes: ringing of the terminal 100, displaying of an incoming call of the user C on a user interface by the terminal 100, vibration of the terminal, flicker of a flashlight of the terminal, and the like.

The user may choose, based on a prompt of the incoming call notification, to reject an incoming call request for the SIM card 2, and continue the voice call for the SIM card 1. Alternatively, a user may choose to hang up the voice call for the SIM card 1, and answer a voice call for the SIM card 2.

Figure 9B:
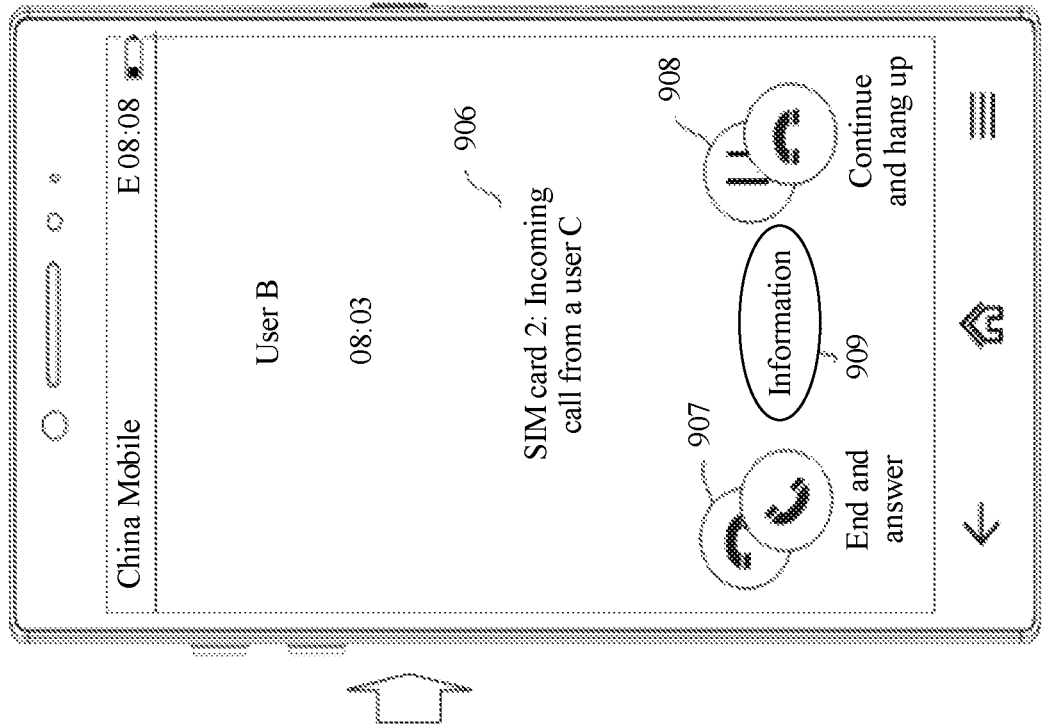
FIG. 9A and FIG. 9B are first schematic diagrams of a GUI displayed when a terminal performs a method in an embodiment of this application during implementation of this application.
Figure 9A:
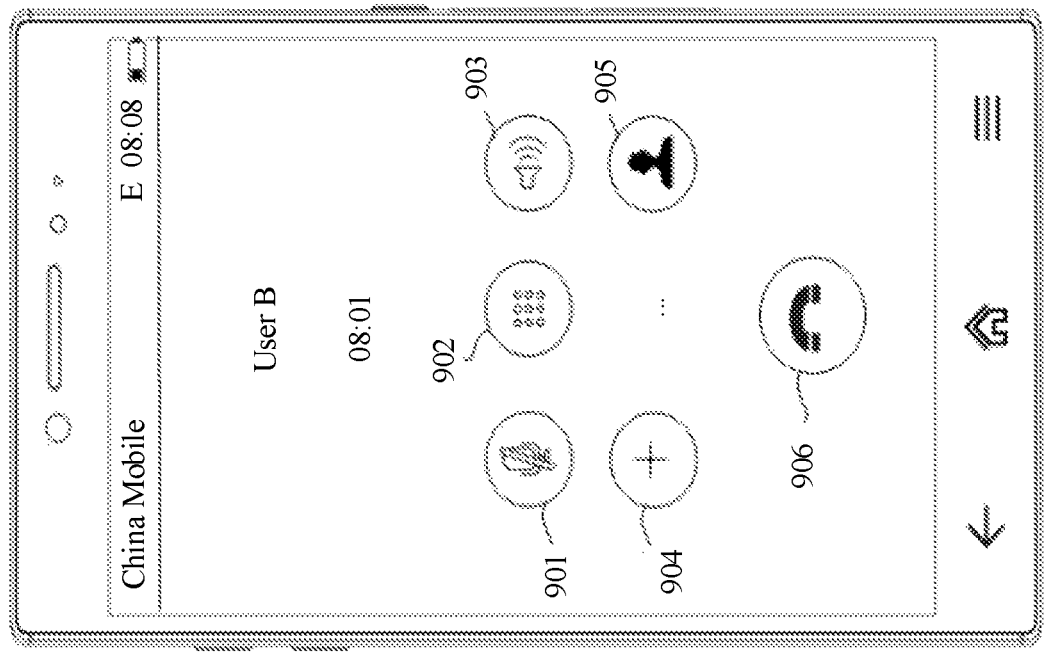

For example, FIG. 9A and FIG. 9B are schematic diagrams of an example of a terminal call interface according to an embodiment of this application. In the process in which the terminal 100 makes the voice call to the terminal 120 (the user B) through the SIM card 1, assuming that a contact method of the user B is stored in an address book of the terminal 100, the terminal 100 may display a graphical user interface (Graphical User Interface, GUI) shown in FIG. 9A. The GUI shown in FIG. 9A may include incoming caller information (such as the "user B"), call time information such as "08:01," a mute icon 901, a dial pad icon 902, a hands free icon 903, a call addition icon 904, an address book icon 905, an on-hook icon 906, and another icon.

In the process in which the SIM card 1 of the terminal 100 makes the voice call with the terminal 120, if the terminal 100 receives an incoming call of the user C for the SIM card 2, after the terminal 100 obtains the incoming call information (such as a phone number of the user C) for the SIM card 2, the terminal 100 may display a graphical user interface (Graphical User Interface, GUI) shown in FIG. 9B. The GUI shown in FIG. 9B may include: incoming call notification information (for example, "SIM card 2: an incoming call of the user C") 906 for the SIM card 2, an end-and-answer icon 907, a continue-and-hang-up icon 908, an information icon 909, and another icon. The icon 907 is used to end an original call (namely, a call with the user B on the SIM card 1) and answer a new call (namely, a call with the user C on the SIM card 2). The icon 908 is used to continue the original call (namely, the call with the user B on the SIM card 1) and hang up the new call (namely, the call with the user C on the SIM card 2). The information icon 909 is used to enter an information editing window, to send a message such as "Contact you later!" or "In a meeting, contact later!" to the terminal 130 (namely, the user C). In some other embodiments, after obtaining the incoming call information (such as the phone number of the user C) for the SIM card 2, the terminal 100 may display only the incoming call notification information (for example, "SIM card 2: an incoming call of the user C") 906 for the SIM card 2. In some other embodiments, the information icon 909 may be displayed after the user chooses to hang up the original call or the new call.

According to a communication method for implementing dual SIM dual active provided in this embodiment, when the SIM card 1 of the terminal 100 is in the call state, the terminal 100 responds to the paging request only when the terminal 100 receives the paging request for the SIM card 2 and the paging request carries the first identifier indicating the second service, and occupies the radio frequency Tx resource to send the RRC signaling, to establish the RRC connection to the base station. In this way, the terminal 100 can implement dual SIM dual active, and reduce interference of a paging request used for a service other than the second service to the voice call for the SIM card 1, thereby ensuring quality of the voice call for the SIM card 1.

In conclusion, according to the solution, the terminal 100 can implement dual SIM dual active of the terminal without affecting quality of a voice call for the calling card, thereby improving user experience.

Figure 10A:
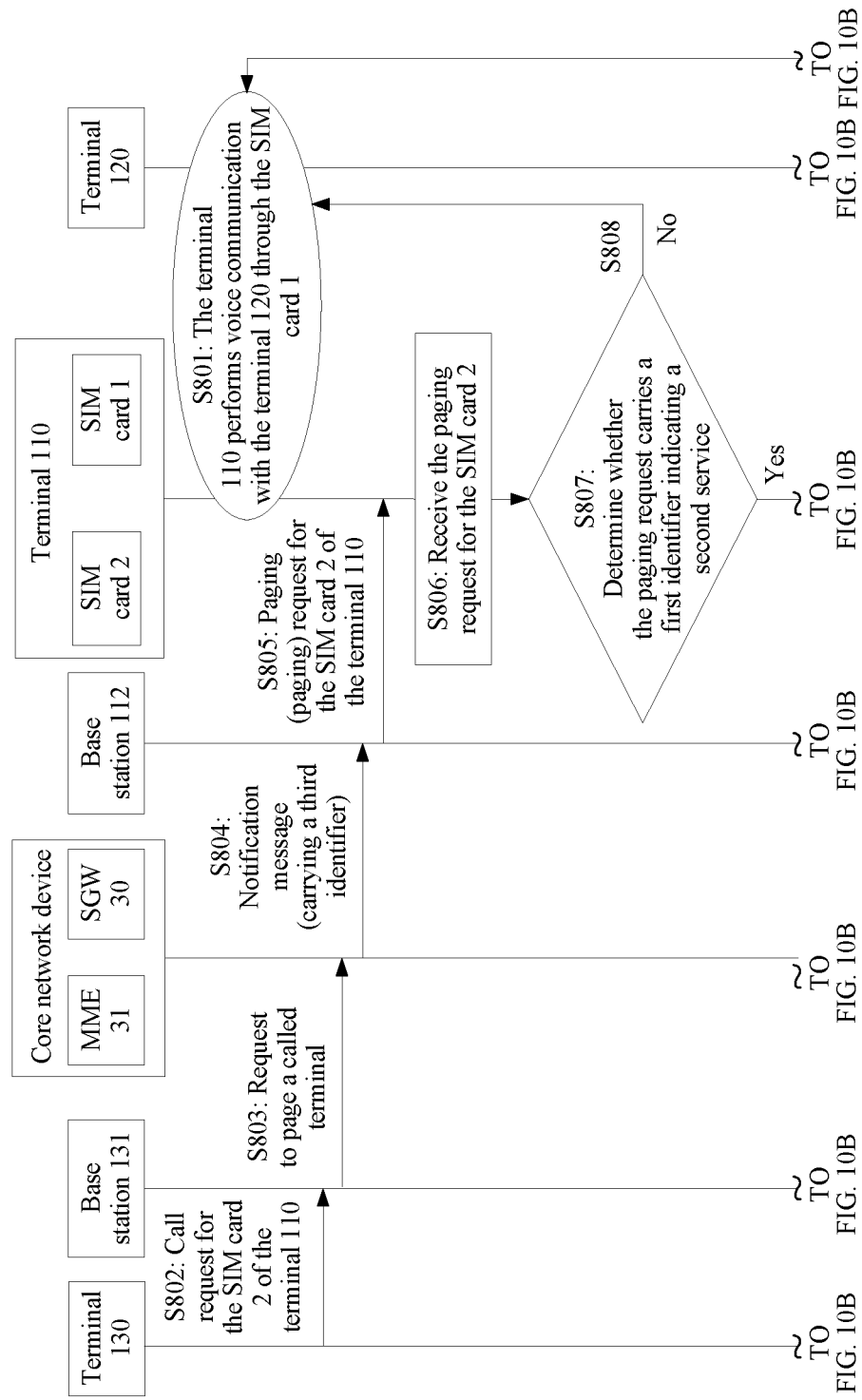
FIG. 10A and FIG. 10B are a second flowchart of a communication method for implementing dual SIM dual active according to an embodiment of this application.
Figure 10B:
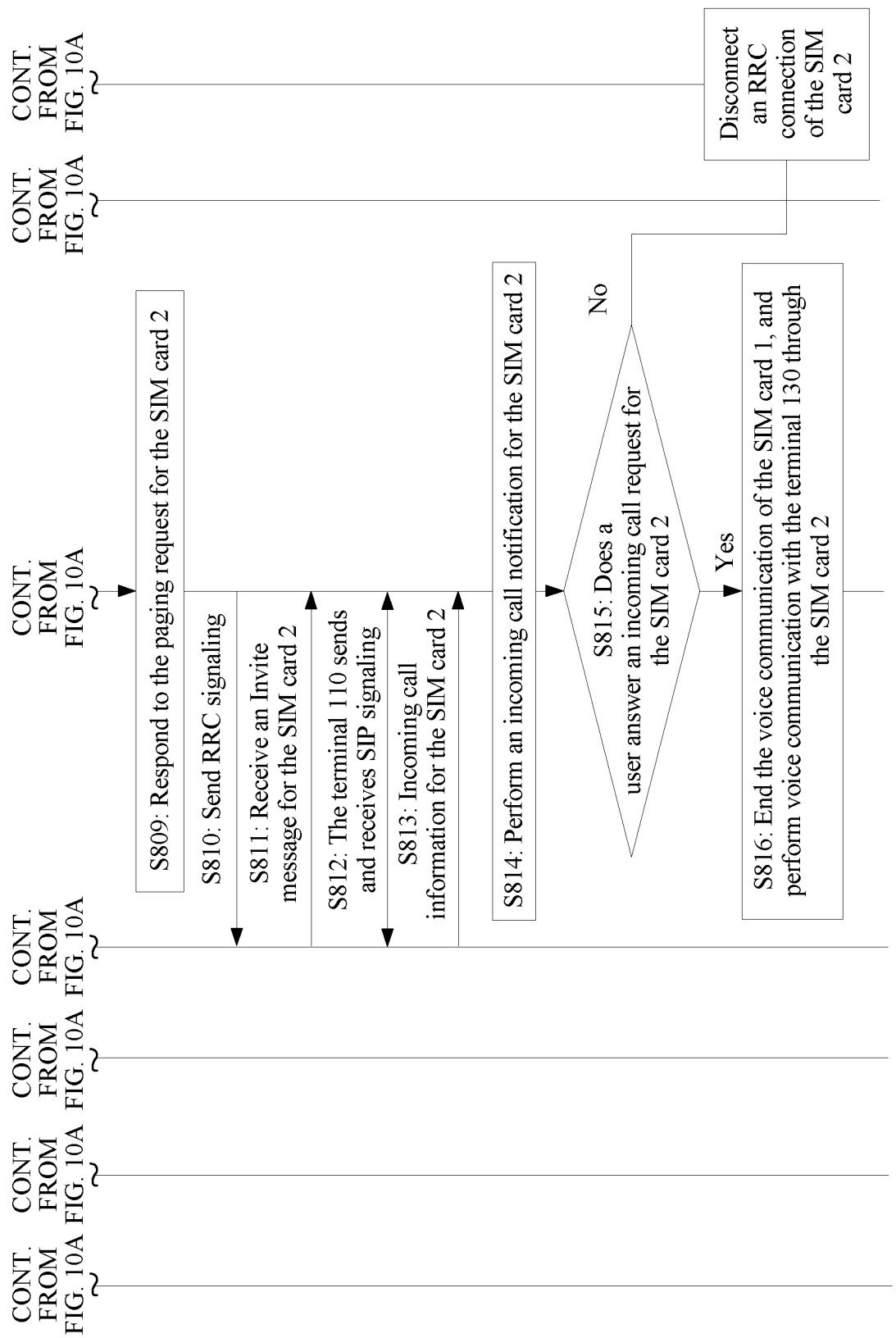

In some embodiments, after displaying the GUI shown in FIG. 9, the terminal 100 may determine, based on a selection of the user for an icon in the GUI shown in FIG. 9, whether the user answers an incoming call request for the SIM card 2. As shown in FIG. 10A and FIG. 10B, after S814, the method in this embodiment of this application may further include S815 and S816.

S815: The terminal 100 determines whether the user answers an incoming call request for the SIM card 2.

If the user chooses to reject the incoming call request for the SIM card 2 and continue the voice call for the SIM card 1, the terminal 100 may disconnect the RRC connection to the SIM card 2. If the user chooses to hang up the voice call for the SIM card 1 and answer the voice call for the SIM card 2, the terminal 100 may continue to perform S814 and a subsequent method procedure thereof.

S816: The terminal 100 ends the voice communication of the SIM card 1, and performs voice communication with the terminal 130 through the SIM card 2 of the terminal 100.

In a process in which the terminal 100 performs the voice communication with the terminal 130 through the SIM card 2, the SIM card 2 of the terminal 100 occupies the radio frequency Tx resource (namely, the radio frequency Tx channel) in the terminal 100.

As shown in FIG. 11A, when a finger of the user touches or approaches the icon 907 displayed on a display panel shown in FIG. 11A, it indicates that the user intends to end the original call (namely, the call with the user B on the SIM card 1) and answer the new call (namely, the call with the user C on the SIM card 2). The touch panel of the terminal 100 detects the touch event on or near the touch panel and transfers the touch event to a processor 410 to determine an instruction corresponding to the touch event. Then, the processor 410 instructs, according to the instruction, the display panel to display a GUI shown in FIG. 11B, so that the user can perform voice communication with the user C. As shown in FIG. 11B and FIG. 11C, the terminal 100 may display, after displaying the GUI shown in FIG. 11B for a period of time (such as 3 seconds), a GUI shown in FIG. 11C.

In some embodiments, the terminal 100 may directly display the GUI shown in FIG. 11C instead of displaying the GUI shown in FIG. 11B.

As shown in FIG. 12A, when the finger of the user touches or approaches the icon 908 displayed on a display panel shown in FIG. 12A, it indicates that the user intends to continue the original call (namely, the call with the user B on the SIM card 1) and hang up the new call (namely, the call with the user C on the SIM card 2). The touch panel of the terminal 100 detects the touch event on or near the touch panel and transfers the touch event to the processor 410 to determine an instruction corresponding to the touch event. Then, the processor 410 instructs, according to the instruction, the display panel to display a GUI shown in FIG. 12B, so that the user can continue to perform the voice communication with the user B. As shown in FIG. 12B and FIG. 12C, the terminal 100 may display, after displaying the GUI shown in FIG. 12B for a period of time (such as 2 seconds), a GUI shown in FIG. 12C.

In some embodiments, the terminal 100 may directly display the GUI shown in FIG. 12C instead of displaying the GUI shown in FIG. 12B.

Optionally, the user may choose, based on a prompt of the incoming call notification, to maintain the voice call for the SIM card 1 (the voice call for the SIM card 1 is paused and held, and answer the voice call for the SIM card 2.

For example, the terminal 100 may further display, on an interface of the incoming call notification, an option used to "maintain the original call and answer the new call." When the user chooses to maintain the original call and answer the new call, the terminal 100 may hold the original call (the voice call between the SIM card 1 and the terminal 120), and answer the new call (the voice call between the SIM card 2 and the terminal 130), that is, control the SIM card 2 to temporarily occupy the radio frequency Tx resource, to continue to answer the original call after the new call is ended or the new call is maintained. Most uplink data packets sent by the SIM card corresponding to the voice call that is maintained (that is, held hold) are empty packets.

Figure 13C:
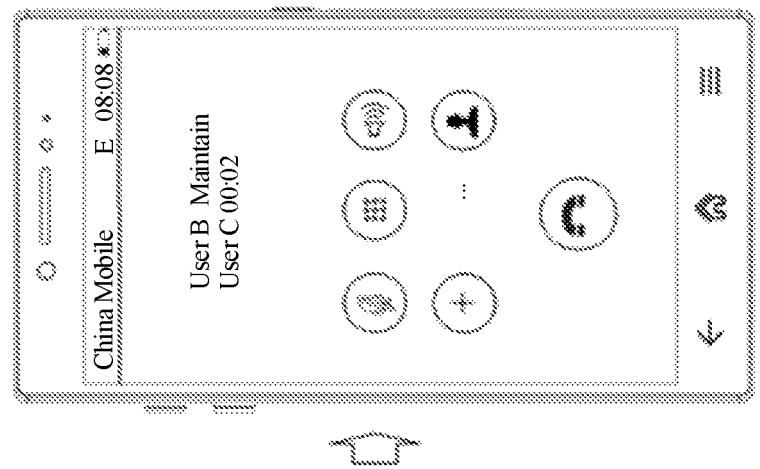
FIG. 13A, FIG. 13B and FIG. 13C are fourth schematic diagram of a GUI displayed when a terminal performs a method in an embodiment of this application during implementation of this application.
Figure 13B:
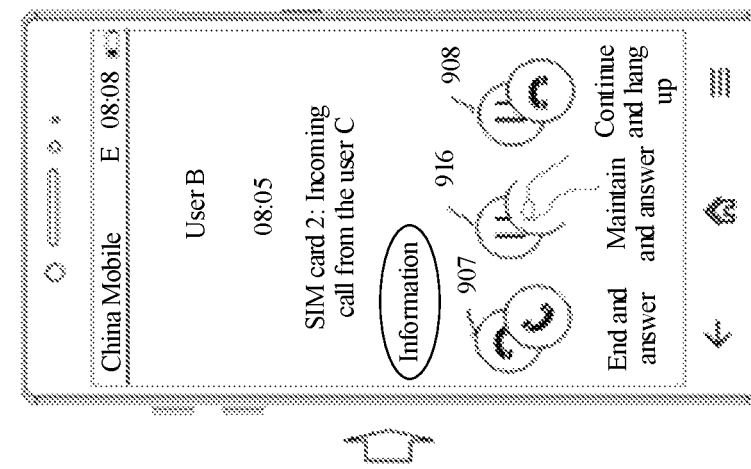
Figure 13A:
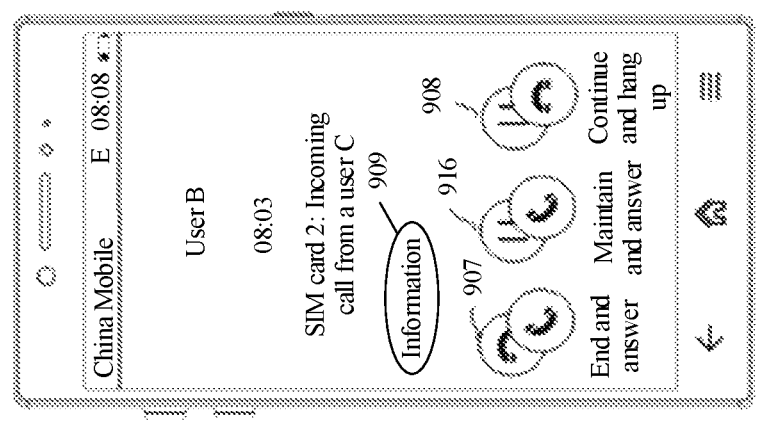

For example, with reference to an example of a terminal call interface shown in FIG. 11A, in the process in which the SIM card 1 of terminal 100 makes the voice call with the terminal 120, when the SIM card 2 receives an incoming call of the user C, after the terminal 100 obtains the incoming call information (such as the phone number of the user C) for the SIM card 2, if the phone number of the incoming call for the SIM card 2 and information about the user C are stored in the address book of the terminal 100, the terminal may display a GUI shown in FIG. 13A. In addition to the icon 906, the icon 907, the icon 908, and the icon 909 shown in FIG. 9B, the GUI shown in FIG. 13A may further include a maintain-and-answer icon 910.

Figure 14A:
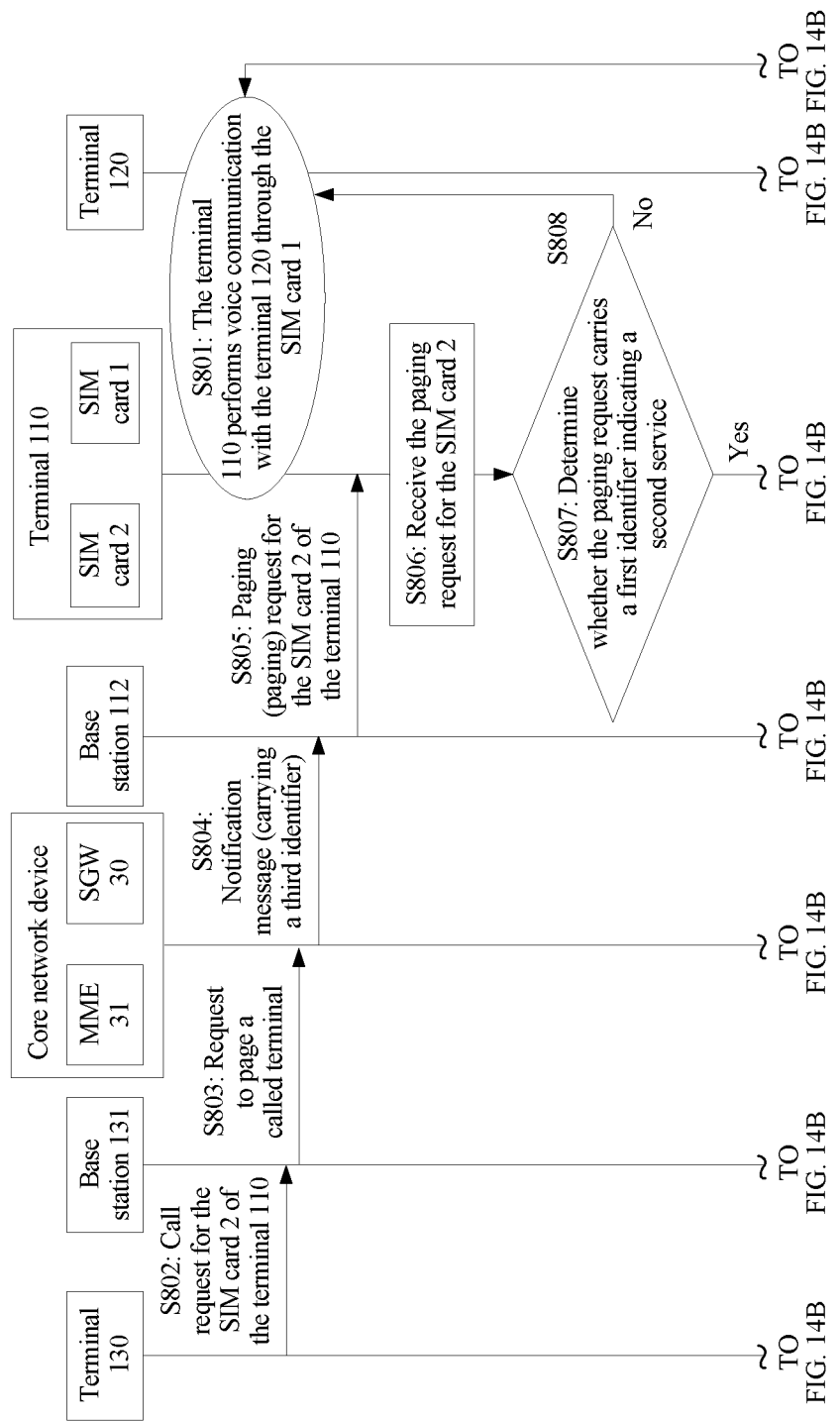
FIG. 14A to FIG. 14C are a third flowchart of a communication method for implementing dual SIM dual active according to an embodiment of this application.
Figure 14B:
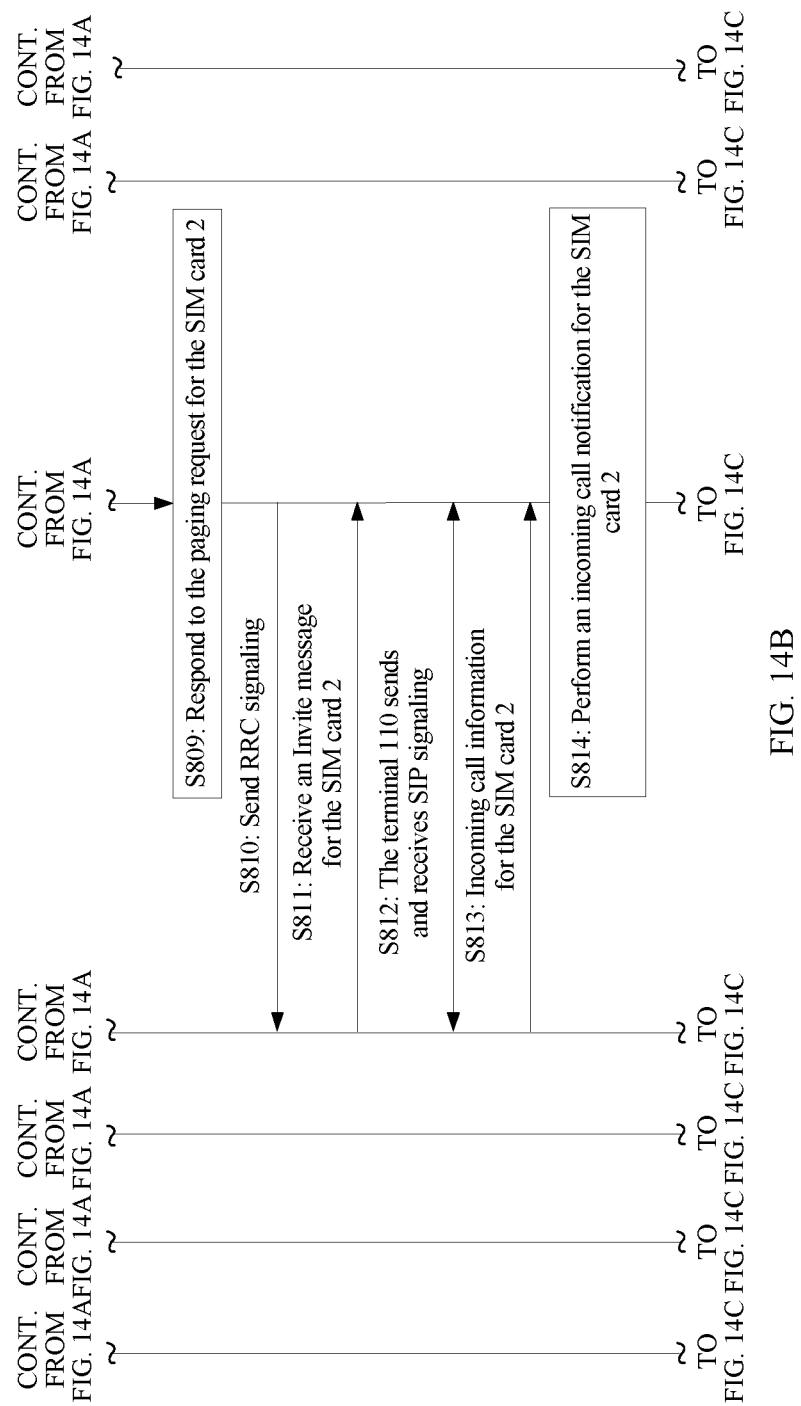
Figure 14C:
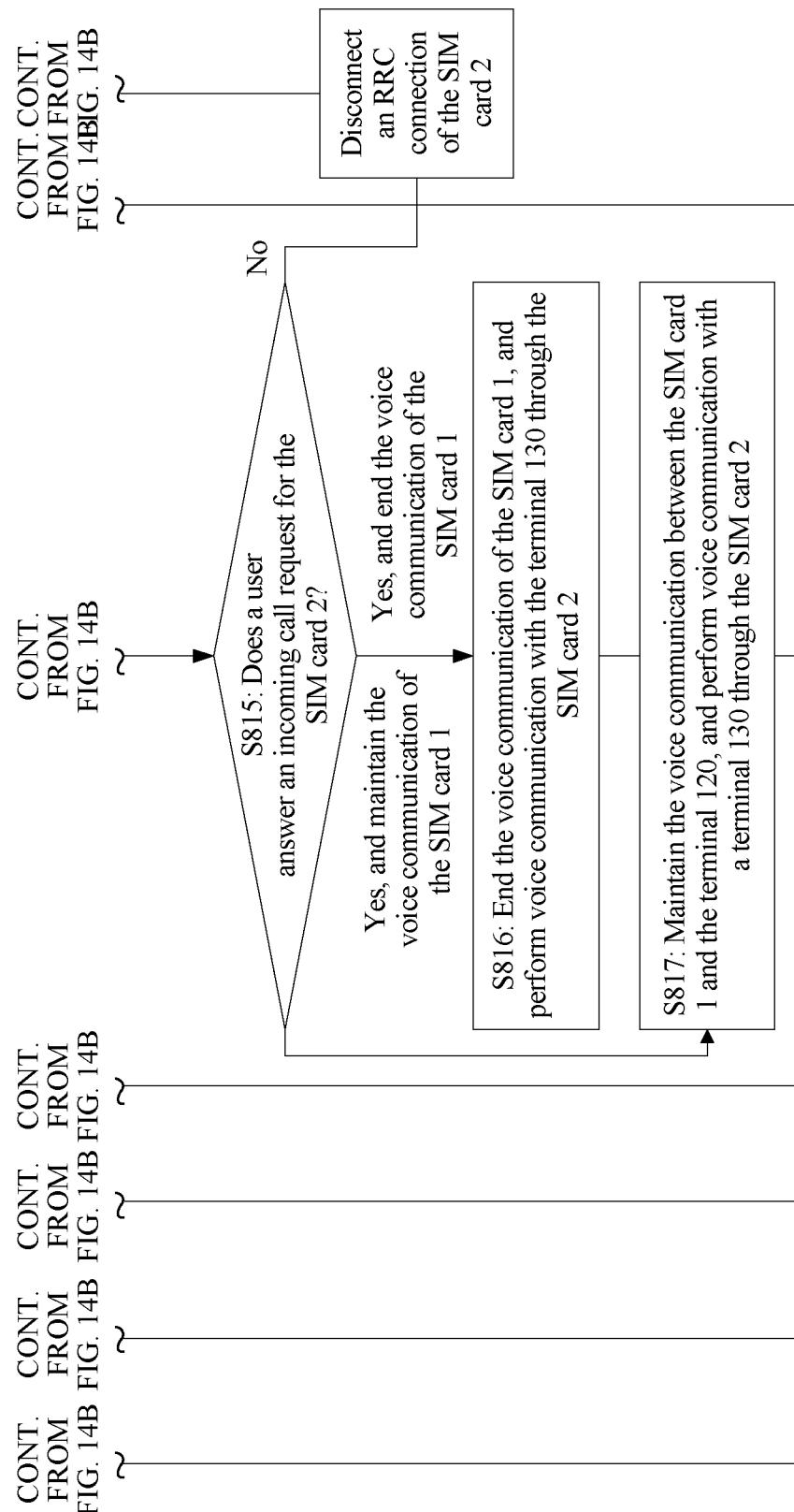

As shown in FIG. 14A to FIG. 14C, after S815, if the user chooses to maintain the voice call for the SIM card 1 and answer the voice call for the SIM card 2, S817 may continue to be performed.

S817: The terminal 100 maintains the voice communication between the SIM card 1 and the terminal 120, and performs the voice communication with the terminal 130 through the SIM card 2.

When a voice call request (namely, an incoming call request of the user C) for the SIM card 2 is relatively important, and the user A needs to answer the incoming call request of the user C, if the user A is unwilling to hang up the original call, the user A may select the maintain-and-answer icon 910, control the terminal 100 to hold the original call (the voice call between the SIM card 1 and the terminal 120), and answer the new call (the voice call between the SIM card 2 and the terminal 130), that is, control the SIM card 2 to temporarily occupy the radio frequency Tx resource, to continue to answer the original call after the new call is ended or the new call is maintained.

As shown in FIG. 13B, when the finger of the user touches or approaches the icon 510 displayed on a display panel shown in FIG. 13B, it indicates that the user intends to maintain the original call (namely, the call with the user B on the SIM card 1) and answer the new call (namely, the call with the user C on the SIM card 2). The touch panel of the terminal 100 detects the touch event on or near the touch panel and transfers the touch event to the processor 410 to determine an instruction corresponding to the touch event. Then, the processor 410 instructs, according to the instruction, the display panel to display a GUI shown in FIG. 13C, so that the user can hold the original call, and perform the voice communication with the user C.

Figure 15A:
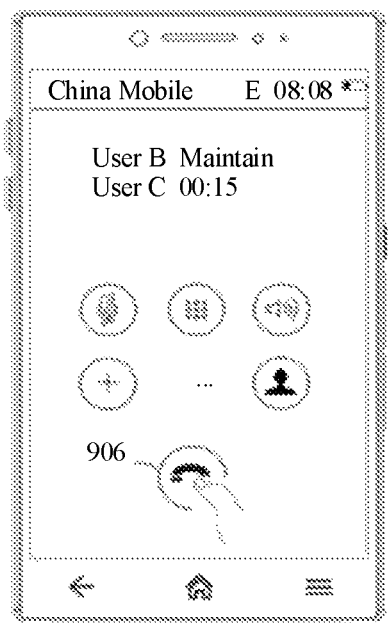
FIG. 15A, FIG. 15B, FIG. 15C and FIG. 15D are fifth schematic diagrams of a GUI displayed when a terminal performs a method in an embodiment of this application during implementation of this application.
Figure 15B:
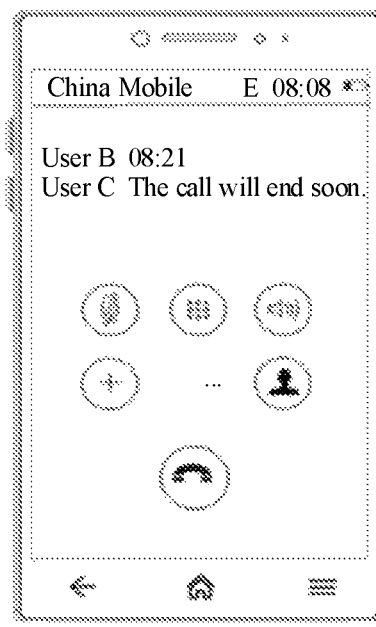
Figure 15D:
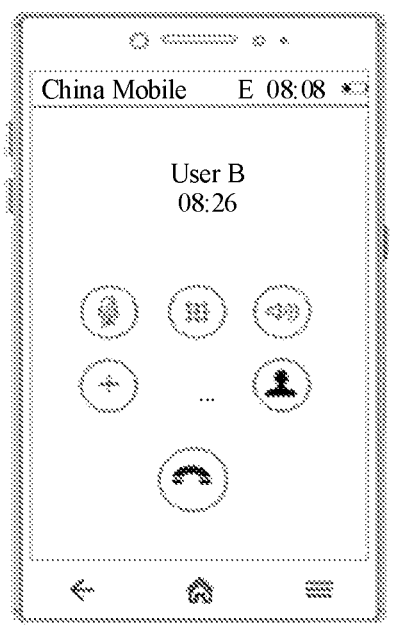
Figure 15C:
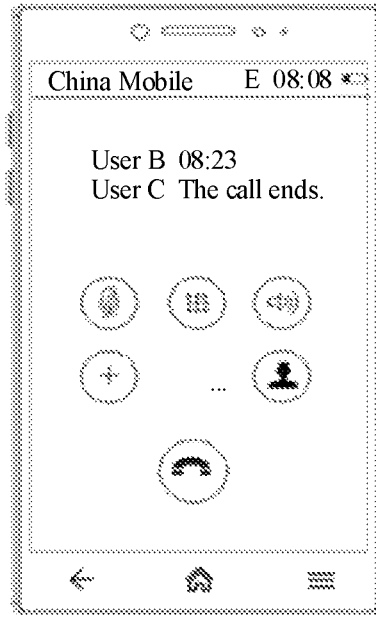

As shown in FIG. 15A, when the finger of the user touches or approaches the icon 506 displayed on a display panel shown in FIG. 15A, it indicates that the user intends to end the new call (namely, the call with the user C on the SIM card 2) and continue the original call (namely, the call with the user B on the SIM card 1). The touch panel of the terminal 100 detects the touch event on or near the touch panel and transfers the touch event to the processor 410 to determine an instruction corresponding to the touch event. Then, the processor 410 instructs, according to the instruction, the display panel to display a GUI shown in FIG. 15B, so that the user can continue to perform the voice communication with the user B. As shown in FIG. 15B and FIG. 15C, the terminal 100 may display, after displaying the GUI shown in FIG. 13B for a period of time (such as 2 seconds), a GUI shown in FIG. 15C. As shown in FIG. 15C and FIG. 15D, the terminal 100 may display, after displaying the GUI shown in FIG. 15C for a period of time (such as 3 seconds), a GUI shown in FIG. 15D.

According to the communication method for implementing dual SIM dual active provided in this embodiment of this application, when the SIM card 1 of the terminal 100 is in the call state, the terminal 100 responds to the paging request only when the terminal 100 receives the paging request for the SIM card 2 and the paging request carries the first identifier indicating the second service, and occupies the radio frequency Tx resource to send the RRC signaling, to establish the RRC connection to the base station. In this way, the terminal 100 can implement dual SIM dual active, and reduce interference of a paging request used for a service other than the second service to the voice call for the SIM card 1, thereby ensuring quality of the voice call for the SIM card 1.

It may be understood that, to implement the foregoing functions, the terminal includes corresponding functional modules for performing the functions. A person of ordinary skill in the art should easily be aware that, in combination with terminals and algorithm steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, the terminal may be divided according to the foregoing method example. For example, the modules or the units may be obtained through division corresponding to various functions, or two or more functions may be integrated into one processing module. The foregoing integrated module may be implemented in a form of hardware, or may be implemented in a form of a software module or unit. In this embodiment of this application, module or unit division is an example, and is merely a logical function division. During actual implementation, another division manner may be used.

Figure 16:
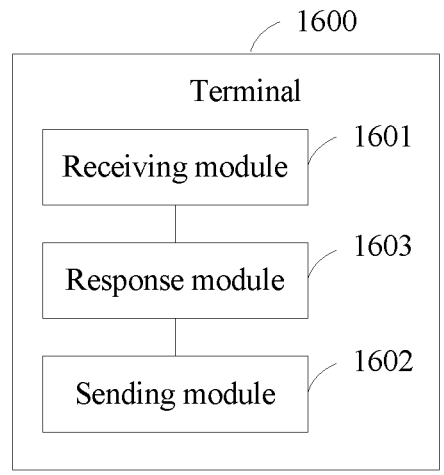
FIG. 16 is a first schematic structural diagram of a terminal according to an embodiment of this application.

FIG. 16 is a possible schematic structural diagram of a terminal in the foregoing embodiment. The terminal 1600 includes a first SIM card interface and a second SIM card interface. The first SIM card interface is configured to communicate with a first SIM card (namely, the foregoing SIM card 1); and the second SIM card interface is configured to communicate with a second SIM card (namely, the foregoing SIM card 2). As shown in FIG. 16, the terminal 1600 includes a receiving module 1601, a sending module 1602, and a response module 1603.

The receiving module 1601 is configured to support S801, S806, S811, S812, S813, and the like in the method embodiment, and/or another process applied to the technology described in this specification.

The sending module 1602 is configured to support S801, S810, and S812 in the method embodiment, and/or another process applied to the technology described in this specification.

The response module 1603 is configured to support S809 in the method embodiment, and/or another process applied to the technology described in this specification.

Further, the terminal 1600 may include a storage module. The storage module is configured to store data such as an address book created by a user in the terminal 1600, and may be further configured to store computer program code.

Further, the terminal 1600 may include a display module. The display module is configured to display an incoming call notification interface of the terminal 1600. For example, the display module is configured to display the GUI shown in any one of FIG. 9, FIG. 11, FIG. 12, FIG. 13, and FIG. 15.

Further, the terminal 1600 may include a judging module. The judging module may be configured to support S807 and S815 in the method embodiment, and/or another process applied to the technology described in this specification.

Further, the terminal 1600 may include an establishment module. The establishment module is configured to support the operation of "establishing an RRC connection" in S810 in the method embodiment.

Figure 17:
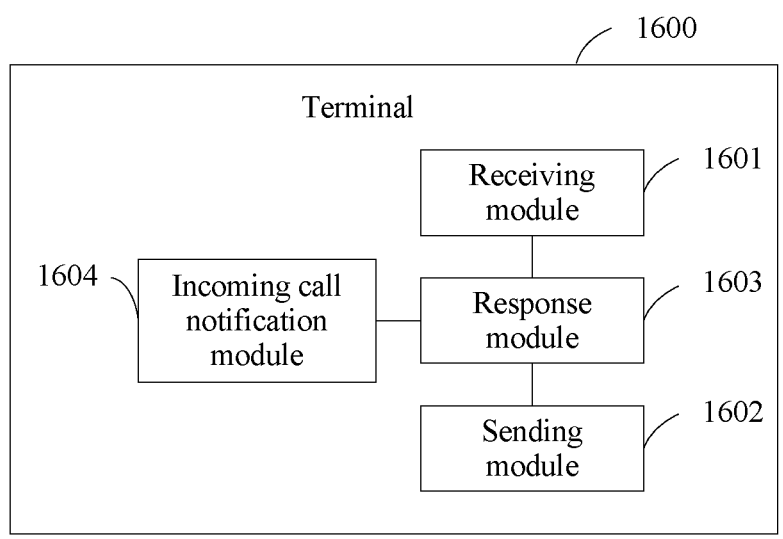
FIG. 17 is a second schematic structural diagram of a terminal according to an embodiment of this application.

Further, as shown in FIG. 17, the terminal 1600 may include an incoming call notification module 1604. The incoming call notification module 1604 is configured to support S814 in the method embodiment, and/or another process applied to the technology described in this specification.

Certainly, the terminal 1600 includes, but is not limited to, the units and the modules listed above. For example, the terminal 1600 may further include a control module supporting the operation of "ending voice communication of the SIM card 1" in S816 in the method embodiment, and the like. In addition, functions that can be specifically implemented by the foregoing modules also include, but are not limited to, functions corresponding to the method steps in the foregoing example. For detailed descriptions of another unit of the terminal 1600 and the units of the terminal 1600, refer to detailed descriptions of method steps corresponding to the units. Details are not described herein again in this embodiment of this application.

When an integrated unit is used, the response module 1603, the judging module, the establishment module, the incoming call notification module 1604, and the like may be integrated into one processing unit for implementation. The processing unit may be a processor or a controller, such as may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field-Programmable Gate Array, FPGA), or another programmable logic device, a transistor logic device, a hardware component, or a combination thereof. The controller/processor may implement or execute various example logical blocks, modules, and circuits described with reference to content disclosed in this application. The processing unit may be a combination implementing a computing function, for example, a combination of one or more microprocessors, or a combination of the DSP and a microprocessor, and or the like. The processing unit may be the processor 510 in FIG. 5, and the storage module may be the memory 560 in FIG. 5. The display module may be the display 531 in FIG. 5.

When the terminal 1600 runs, the terminal 1600 performs the communication method for implementing dual SIM dual active in the embodiment shown in FIG. 8A and FIG. 8B, FIG. 10A and FIG. 10B, or FIG. 14A to FIG. 14C. For a specific communication method for implementing dual SIM dual active, refer to related descriptions of the embodiment shown in FIG. 8A and FIG. 8B, FIG. 10A and FIG. 10B, or FIG. 14A to FIG. 14C. Details are not described herein again.

An embodiment of this application further provides a computer storage medium. The computer storage medium stores computer program code. When the processor of the terminal 1600 executes the computer program code, the terminal 1600 performs related method steps in FIG. 8A and FIG. 8B, FIG. 10A and FIG. 10B, or FIG. 14A to FIG. 14C to implement the communication method for implementing dual SIM dual active in the foregoing embodiment.

An embodiment of this application further provides a computer program product including an instruction; and when the computer program product runs on the terminal 1600, the terminal 1600 is enabled to perform related method steps in FIG. 8A and FIG. 8B, FIG. 10A and FIG. 10B, or FIG. 14A to FIG. 14C to implement the communication method for implementing dual SIM dual active in the foregoing embodiment.

The terminal, the computer storage medium, and the computer program product including the instruction provided in the embodiments of this application are all configured to perform the corresponding methods provided above. Therefore, for beneficial effects that can be achieved by the terminal, the computer storage medium, and the computer program product including the instruction, refer to beneficial effects of the corresponding methods provided above. Details are not described herein again.

An embodiment of this application provides a mobility management entity MME. The general MME is configured to perform steps performed by the exemplary MME 31 in the foregoing communication method for implementing dual SIM dual active. The MME provided in this embodiment of this application may include modules corresponding to corresponding steps.

In this embodiment of this application, functional modules of the network device may be obtained through division according to the foregoing method example. For example, the functional modules may be obtained through division corresponding to various functions, or two or more functions may be integrated into one processing module. The integrated module may be implemented in a form of hardware, or may be implemented in a form of a software functional module. In this embodiment of this application, module division is an example, and is merely a logical function division. During actual implementation, another division manner may be used.

Figure 18:
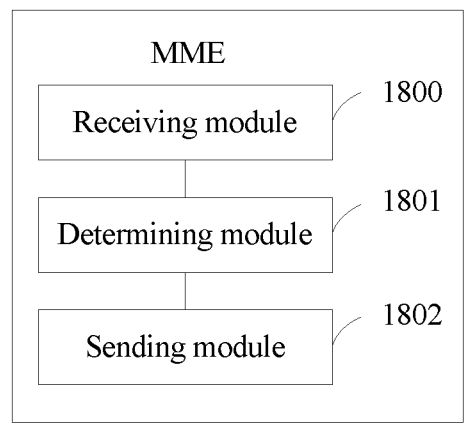
FIG. 18 is a second schematic structural diagram of an MME according to an embodiment of this application.

When functional modules are obtained through division by using corresponding functions, FIG. 18 is a possible schematic structural diagram of an MME in the foregoing embodiment. As shown in FIG. 18, the MME includes a receiving module 1800, a determining module 1801, and a sending module 1802. The receiving module 1800 is configured to support "receiving a first message carrying first information" described in this specification, and/or another process applied to the technology described in this specification. The determining module 1801 is configured to support "determining, based on the first information, whether a priority of a SIM card 2 of a terminal 100 is higher than a preset level" described in this specification. The sending module 1802 is configured to support "sending a notification message carrying a third identifier" described in this specification. For all related content of the steps in the method embodiment, refer to function descriptions of corresponding functional modules. Details are not described herein again. Certainly, the MME provided in this embodiment of this application includes, but is not limited to, the foregoing modules. For example, the MME may further include a storage module 1803. The storage module 1803 may be configured to store a context of a terminal, and may also be configured to store program code and data of the MME.

It should be noted that, for all related content of the steps in the method embodiment, reference may be made to function descriptions of corresponding functional modules. Details are not described herein again.

When an integrated unit is used, the foregoing determining module unit may be a processor or a controller, for example, may be a CPU, a general purpose processor, a DSP, an ASIC, an FPGA, or another programmable logic device, a transistor logic device, a hardware component, or any combination thereof. The controller/processor may implement or execute various example logical blocks, modules, and circuits described with reference to content disclosed in this application. The processing unit may be a combination implementing a computing function, for example, a combination of one or more microprocessors, or a combination of the DSP and a microprocessor, and or the like. The processing unit may be the processor 71 in FIG. 7. The storage module 1803 may be the memory 72 in FIG. 7. The receiving module 1800 and the sending module 1802 may be the communications interface 70 in FIG. 7.

When the MME runs, the MME performs the communication method for implementing dual SIM dual active in the embodiment shown in FIG. 8A and FIG. 8B, FIG. 10A and FIG. 10B, or FIG. 14A to FIG. 14C. For a specific communication method for implementing dual SIM dual active, refer to related descriptions of the embodiment shown in FIG. 8A and FIG. 8B, FIG. 10A and FIG. 10B, or FIG. 14A to FIG. 14C. Details are not described herein again.

An embodiment of this application further provides a computer program product including an instruction; and when the computer program product runs on an MME, the MME is enabled to perform related method steps in FIG. 8A and FIG. 8B, FIG. 10A and FIG. 10B, or FIG. 14A to FIG. 14C to implement the communication method for implementing dual SIM dual active in the foregoing embodiment.

An embodiment of this application provides a radio access network device. The radio access network device is configured to perform steps performed by any base station in the foregoing communication method for implementing dual SIM dual active. The radio access network device provided in this embodiment of this application may include modules corresponding to corresponding steps.

In this embodiment of this application, functional modules of the radio access network device may be obtained through division according to the foregoing method examples. For example, the functional modules may be obtained through division corresponding to various functions, or two or more functions may be integrated into one processing module. The integrated module may be implemented in a form of hardware, or may be implemented in a form of a software functional module. In this embodiment of this application, module division is an example, and is merely a logical function division. During actual implementation, another division manner may be used.

Figure 19:
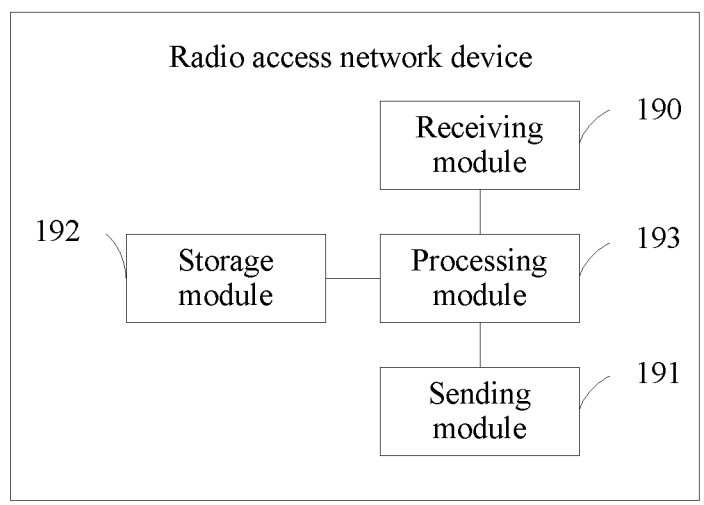
FIG. 19 is a first schematic structural diagram of a radio access network device according to an embodiment of this application.

When functional modules are obtained through division by using corresponding functions, FIG. 19 is a possible schematic structural diagram of a radio access network device in the foregoing embodiment. As shown in FIG. 19, the radio access network device includes a receiving module 190 and a sending module 191. The receiving module 190 is configured to support the radio access network device in performing S802, S804, S810, S812, and the like in the foregoing embodiment, and/or another process applied to the technology described in this specification. The sending module 191 is configured to support the radio access network device in performing S803, S805, S811, S813, and the like in the foregoing embodiment, and/or another process applied to the technology described in this specification. For all related content of the steps in the method embodiment, refer to function descriptions of corresponding functional modules. Details are not described herein again. Certainly, the radio access network device provided in this embodiment of this application includes, but is not limited to, the foregoing modules. For example, the radio access network device may further include a storage module 192 and a processing module 193. The storage module 192 may be configured to store program code and data of the radio access network device.

It should be noted that, for all related content of the steps in the method embodiment, reference may be made to function descriptions of corresponding functional modules. Details are not described herein again.

When an integrated unit is used, the foregoing processing module 193 may be a processor or a controller, for example, may be a CPU, a general purpose processor, a DSP, an ASIC, an FPGA, or another programmable logic device, a transistor logic device, a hardware component, or any combination thereof. The controller/processor may implement or execute various example logical blocks, modules, and circuits described with reference to content disclosed in this application. The processing unit may be a combination implementing a computing function, for example, a combination of one or more microprocessors, or a combination of the DSP and a microprocessor, and or the like. The storage module 192 may be a memory. The receiving module 190 and the sending module 191 may be a communications interface.

Figure 20:
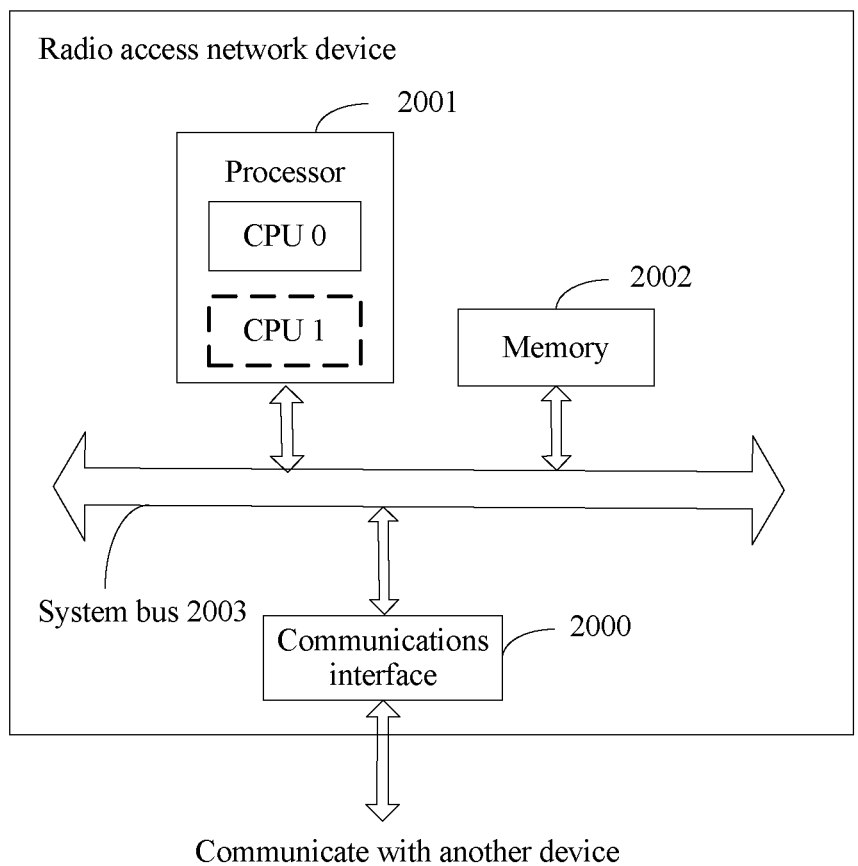
FIG. 20 is a second schematic structural diagram of a radio access network device according to an embodiment of this application.

When the processing module 193 is the processor, the receiving module 190 and the sending module 191 are the communications interface, and the storage module 192 is the memory, the radio access network device in this embodiment of this application may be a radio access network device shown in FIG. 20.

As shown in FIG. 20, the radio access network device includes a communications interface 2000, a processor 2001, and a memory 2002. The communications interface 2000, the processor 2001, and the memory 2002 are connected to each other by using a system bus 2003, and complete mutual communication.

When the radio access network device runs, the radio access network device performs the communication method for implementing dual SIM dual active in the embodiment shown in FIG. 8A and FIG. 8B, FIG. 10A and FIG. 10B, or FIG. 14A to FIG. 14C. For a specific communication method for implementing dual SIM dual active, refer to related descriptions of the embodiment shown in FIG. 8A and FIG. 8B, FIG. 10A and FIG. 10B, or FIG. 14A to FIG. 14C. Details are not described herein again.

The communications interface 2000 is configured to communicate with another device or communications network such as the Ethernet or a WLAN.

The memory 2002 is configured to store a software program and an application module. The processor 2001 runs the software program and the application module that are stored in the memory 2002, to perform various functional applications and data processing of the radio access network device.

The memory 2002 may include a volatile memory (Volatile Memory), for example, a RAM; or the memory may include a non-volatile memory (non-volatile memory), for example, a ROM, a flash memory (Flash Memory), an HDD, an SSD, a magnetic disk storage medium or another magnetic storage device, or any other medium that can be configured to carry or store expected program code in a form of an instruction or a data structure and that can be accessed by the radio access network device. However, this is not limited thereto.

The memory 2002 may exist independently and be connected to the processor 2001 by using the system bus 2003. Alternatively, the memory 2002 may be integrated with the processor 2001.

The processor 2001 is a control center of the radio access network device. The processor 2001 is connected to various parts of the radio access network device. By running or executing the software program and/or the application module stored in the memory 2002, and invoking data stored in the memory 2002, the processor 2001 performs various functions and data processing of the radio access network device, to perform overall monitoring on the radio access network device.

During specific implementation, in an embodiment, the processor 2001 may include one or more CPUs; for example, the processor 2001 in FIG. 9 includes a CPU 0 and a CPU 1.

The system bus 2003 may be a PCI bus, an EISA bus, or the like.

The system bus 2003 may be classified into an address bus, a data bus, a control bus, and the like. In this embodiment of this application, for clear description, various buses in FIG. 20 are all illustrated as the system bus 2003.

An embodiment of this application further provides a computer program product including an instruction; and when the computer program product runs on a radio access network device, the radio access network device is enabled to perform related method steps in FIG. 8A and FIG. 8B, FIG. 10A and FIG. 10B, or FIG. 14A to FIG. 14C to implement the communication method for implementing dual SIM dual active in the foregoing embodiment.

The foregoing descriptions about implementations allow a person skilled in the art to understand that, for the purpose of convenient and brief description, division of the foregoing functional modules is used as an example for description. During actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A terminal comprising:
a subscriber identity module (SIM) card interface configured to communicate with a SIM card; and
a processor coupled to the SIM card interface and configured to:
receive a paging request requesting to establish a communication connection, wherein the communication connection is a voice call service related to the SIM card;
determine whether the paging request comprises a first identifier indicating the voice call service; and
skip sending, to a radio access network device, a Radio Resource Control (RRC) signaling for establishing an RRC connection when the paging request does not carry the first identifier.

2. The terminal of claim 1, wherein the paging request is communicated in a Long-Term Evolution (LTE) network, and wherein the processor is further configured to:
establish the RRC connection; and
send Session Initiation Protocol (SIP) signaling to the radio access network device.

3. The terminal of claim 2, wherein the processor is further configured to:
obtain, from the radio access network device, incoming call information corresponding to the communication connection; and
perform an incoming call notification for the communication connection.

4. The terminal of claim 1, wherein the processor is further configured to send to the radio access network device, the RRC signaling for establishing an RRC connection when the paging request carries the first identifier.

5. A mobility management entity (MME) comprising:
a memory configured to store instructions; and
a processor coupled to the memory, wherein the instructions cause the processor to be configured to:
receive a first message carrying a first identifier of a subscriber identity module (SIM) card of a terminal and first information indicating a priority of the SIM card, wherein the first message instructs the MME to send a notification message to a radio access network device in a tracking area (TA) list of the terminal;
determine, based on the first information, whether the priority is higher than a preset level; and
send a notification message carrying a second identifier to the radio access network device when the priority is higher than the preset level,
wherein the notification message instructs the radio access network device to page the SIM card and establish a connection to a first service related to the SIM card, and
wherein the second identifier indicates a second service.

6. The MME of claim 5, wherein the instructions further cause the processor to be configured to determine that the priority is higher than the preset level when a value of the first information is less than or equal to a preset threshold.

7. The MME of claim 5, wherein the instructions further cause the processor to be configured to determine that the priority is lower than the preset level when a value of the first information is greater than a preset threshold.

8. The MME of claim 5, wherein the first service is a voice call.

9. The MME of claim 5, wherein the first message is a downlink data notification (DDN) message.

10. The MME of claim 5, wherein the first message is a create bearer request.

11. The MME of claim 5, wherein the first message is an update bearer request.

12. A radio access network device comprising:
a memory configured to store instructions; and
a processor coupled to the memory, wherein the instructions cause the processor to be configured to:
receive a notification message from a mobility management entity (MME), wherein the notification message instructs the radio access network device to page a subscriber identity module (SIM) card of a terminal;
determine whether the notification message comprises a second identifier; and
send a paging request carrying a first identifier to the terminal when the notification message carries the second identifier,
wherein both the second identifier and the first identifier indicate a service related to the SIM card, and
wherein the paging request requests to establish a connection to the service.

13. The radio access network device of claim 12, wherein the service is a voice call.

14. A system-on-chip comprising:
a processor;
a subscriber identity module (SIM) card interface coupled to the processor and configured to couple to a SIM card; and
a memory coupled to the processor and the SIM card interface, and configured to store computer program code comprising instructions, wherein the instructions cause the processor to be configured to:
receive a paging request, wherein the paging request requests to establish a communication connection, and wherein the communication connection comprises a voice call service related to the SIM card;
determine whether the paging request comprises a first identifier indicating the voice call service; and
skip sending to a radio access network device, Radio Resource Control (RRC) signaling for establishing an RRC connection when the paging request does not carry the first identifier.

15. The system-on-chip of claim 14, wherein the paging request is communicated in a Long-Term Evolution (LTE) network.

16. The system-on-chip of claim 15, wherein the processor is further configured to send to the radio access network device, the RRC signaling for establishing an RRC connection when the paging request carries the first identifier.

17. The system-on-chip of claim 14, wherein the processor is further configured to:
establish the RRC connection; and
send Session Initiation Protocol (SIP) signaling to the radio access network device.

18. The system-on-chip of claim 17, wherein the processor is further configured to obtain, from the radio access network device, incoming call information corresponding to the communication connection.

19. The system-on-chip of claim 18, wherein the processor is further configured to perform an incoming call notification for the communication connection.

20. The system-on-chip of claim 14, wherein the system-on-chip is housed in a mobile device.

21. The system-on-chip of claim 14, further comprising a graphical user interface coupled to the processor.

22. The system-on-chip of claim 14, further comprising an audio interface coupled to the processor.

* * * * *

UNITED STATES PATENT AND TRADEMARK OFFICE
CERTIFICATE OF CORRECTION

PATENT NO. : 11,470,667 B2
APPLICATION NO. : 17/100290
DATED : October 11, 2022
INVENTOR(S) : Fengguang Qiu, Bin Huang and Delai Zheng It is certified that error appears in the above-identified patent and that said Letters Patent is hereby corrected as shown below:

On the Title Page

Page 2, item [56], Line 2: "Project Jechnical Specification" should read "Project Technical Specification"

Page 2, item [56], Line 7: "Project Jechnical Specification" should read "Project Technical Specification"

Page 2, item [56], Line 11: "Project Jechnical Specification" should read "Project Technical Specification"

In the Claims

Claim 1, Column 36, Line 26: "skip, sending to" should read "skip sending to"

Signed and Sealed this
Twenty-ninth Day of November, 2022

Katherine Kelly Vidal
*Director of the United States Patent and Trademark Office*